US00RE49389E

(19) United States
(12) Reissued Patent
Chaji et al.

(10) Patent Number: US RE49,389 E
(45) Date of Reissued Patent: *Jan. 24, 2023

(54) METHOD AND SYSTEM FOR DRIVING LIGHT EMITTING DISPLAY

(71) Applicant: Ignis Innovation Inc., Waterloo (CA)

(72) Inventors: Gholamreza Chaji, Waterloo (CA); Kongning Li, Toronto (CA); Vasudha Gupta, Cupertino, CA (US); Arokia Nathan, Cambridge (CA)

(73) Assignee: Ignis Innovation Inc., Waterloo (CA)

( * ) Notice: This patent is subject to a terminal disclaimer.

(21) Appl. No.: 15/687,017

(22) Filed: Aug. 25, 2017

Related U.S. Patent Documents

Reissue of:
(64) Patent No.: 8,471,875
Issued: Jun. 25, 2013
Appl. No.: 12/510,780
Filed: Jul. 28, 2009

U.S. Applications:
(63) Continuation of application No. 14/477,037, filed on Sep. 4, 2014, now Pat. No. Re. 46,561, which is an application for the reissue of Pat. No. 8,471,875.

(30) Foreign Application Priority Data

Jul. 29, 2008 (CA) ..... CA2637343
Jul. 24, 2009 (CA) ..... CA2672590

(51) Int. Cl.
*G09G 5/10* (2006.01)
*G09G 3/36* (2006.01)
(Continued)

(52) U.S. Cl.
CPC ..... *G09G 3/3696* (2013.01); *G09G 3/20* (2013.01); *G09G 3/3677* (2013.01);
(Continued)

(58) Field of Classification Search
CPC ..... G09G 3/20; G09G 3/3688; G09G 3/3696; G09G 3/3266; G09G 3/3275;
(Continued)

(56) References Cited

U.S. PATENT DOCUMENTS 3,506,851 A 4/1970 Polkinghom et al.
3,750,987 A 8/1973 Gobel
(Continued)

FOREIGN PATENT DOCUMENTS

AU 729652 6/1997
AU 764896 12/2001
(Continued)

OTHER PUBLICATIONS

Ahnood et al.: "Effect of threshold voltage instability on field effect mobility in thin film transistors deduced from constant current measurements", dated Aug. 2009.
(Continued)

*Primary Examiner* — Woo H Choi
(74) *Attorney, Agent, or Firm* — Stratford Group Ltd.

(57) ABSTRACT

A display system includes a driver for operating a panel having a plurality of pixels arranged by a plurality of first lines and at least one second line The driver includes a driver output unit for providing to the panel a single driver output for activating the plurality of first lines, the single driver output being demultiplexed on the panel to activate each first line.

5 Claims, 19 Drawing Sheets

(51) Int. Cl.
*G09G 3/20* (2006.01)
*G09G 3/3266* (2016.01)
*G09G 3/3275* (2016.01)

(52) U.S. Cl.
CPC ..... *G09G 3/3688* (2013.01); *G09G 3/3266* (2013.01); *G09G 3/3275* (2013.01); *G09G 2300/0452* (2013.01); *G09G 2310/027* (2013.01); *G09G 2310/0218* (2013.01); *G09G 2310/0267* (2013.01); *G09G 2310/0286* (2013.01); *G09G 2310/0294* (2013.01); *G09G 2310/0297* (2013.01); *G09G 2320/0276* (2013.01); *G09G 2320/0673* (2013.01)

(58) Field of Classification Search
CPC ... G09G 2320/0276; G09G 2310/0297; G09G 2300/0452; G09G 2310/2118; G09G 2310/0267; G09G 2310/27; G09G 2310/0286; G09G 2310/0294; G09G 2320/0673
See application file for complete search history.

(56) References Cited

U.S. PATENT DOCUMENTS 3,774,055 A 11/1973 Bapat et al.
4,090,096 A 5/1978 Nagami
4,354,162 A 10/1982 Wright
4,996,523 A 2/1991 Bell et al.
5,134,387 A * 7/1992 Smith et al. ..... 345/83
5,153,420 A 10/1992 Hack et al.
5,170,158 A 12/1992 Shinya
5,204,661 A 4/1993 Hack et al.
5,266,515 A 11/1993 Robb et al.
5,278,542 A * 1/1994 Smith et al. ..... 345/690
5,408,267 A 4/1995 Main
5,498,880 A 3/1996 Lee et al.
5,572,444 A 11/1996 Lentz et al.
5,589,847 A 12/1996 Lewis
5,619,033 A 4/1997 Weisfield
5,648,276 A 7/1997 Hara et al.
5,670,973 A 9/1997 Bassetti et al.
5,691,783 A 11/1997 Numao et al.
5,701,505 A 12/1997 Yamashita et al.
5,714,968 A 2/1998 Ikeda
5,744,824 A 4/1998 Kousai et al.
5,745,660 A 4/1998 Kolpatzik et al.
5,748,160 A 5/1998 Shieh et al.
5,758,129 A 5/1998 Gray et al.
5,835,376 A 11/1998 Smith et al.
5,870,071 A 2/1999 Kawahata
5,874,803 A 2/1999 Garbuzov et al.
5,880,582 A 3/1999 Sawada
5,903,248 A 5/1999 Irwin
5,917,280 A 6/1999 Burrows et al.
5,949,398 A 9/1999 Kim
5,952,789 A 9/1999 Stewart et al.
5,990,629 A 11/1999 Yamada et al.
6,023,259 A 2/2000 Howard et al.
6,069,365 A 5/2000 Chow et al.
6,091,203 A 7/2000 Kawashima et al.
6,097,360 A 8/2000 Holloman
6,100,868 A 8/2000 Lee et al.
6,144,222 A 11/2000 Ho
6,229,506 B1 5/2001 Dawson et al.
6,229,508 B1 5/2001 Kane
6,246,180 B1 6/2001 Nishigaki
6,252,248 B1 6/2001 Sano et al.
6,268,841 B1 7/2001 Cairns et al.
6,288,696 B1 9/2001 Holloman
6,307,322 B1 10/2001 Dawson et al.
6,310,962 B1 10/2001 Chung et al.
6,323,631 B1 11/2001 Juang
6,333,729 B1 * 12/2001 Ha ..... 345/98
6,388,653 B1 * 5/2002 Goto et al. ..... 345/98
6,392,617 B1 5/2002 Gleason
6,396,469 B1 5/2002 Miwa et al.
6,414,661 B1 7/2002 Shen
6,417,825 B1 7/2002 Stewart et al.
6,430,496 B1 8/2002 Smith et al.
6,433,488 B1 8/2002 Bu
6,473,065 B1 10/2002 Fan
6,475,845 B2 11/2002 Kimura
6,501,098 B2 12/2002 Yamazaki
6,501,466 B1 12/2002 Yamagashi et al.
6,522,315 B2 2/2003 Ozawa et al.
6,535,185 B2 3/2003 Kim et al.
6,542,138 B1 4/2003 Shannon et al.
6,559,839 B1 5/2003 Ueno et al.
6,580,408 B1 6/2003 Bae et al.
6,583,398 B2 6/2003 Harkin
6,618,030 B2 9/2003 Kane et al.
6,639,244 B1 10/2003 Yamazaki et al.
6,680,580 B1 1/2004 Sung
6,686,699 B2 2/2004 Yumoto
6,690,000 B1 2/2004 Muramatsu et al.
6,693,610 B2 2/2004 Shannon et al.
6,694,248 B2 2/2004 Smith et al.
6,697,057 B2 2/2004 Koyama et al.
6,724,151 B2 4/2004 Yoo
6,734,636 B2 5/2004 Sanford et al.
6,753,655 B2 6/2004 Shih et al.
6,753,834 B2 6/2004 Mikami et al.
6,756,741 B2 6/2004 Li
6,777,888 B2 8/2004 Kondo
6,781,567 B2 8/2004 Kimura
6,788,231 B1 9/2004 Hsueh
6,809,706 B2 10/2004 Shimoda
6,828,950 B2 12/2004 Koyama
6,858,991 B2 2/2005 Miyazawa
6,859,193 B1 2/2005 Yumoto
6,876,346 B2 4/2005 Anzai et al.
6,900,485 B2 5/2005 Lee
6,903,734 B2 6/2005 Eu
6,911,960 B1 6/2005 Yokoyama
6,911,964 B2 6/2005 Lee et al.
6,914,448 B2 7/2005 Jinno
6,919,871 B2 7/2005 Kwon
6,924,602 B2 8/2005 Komiya
6,937,220 B2 8/2005 Kitaura et al.
6,940,214 B1 9/2005 Komiya et al.
6,954,194 B2 10/2005 Matsumoto et al.
6,970,149 B2 11/2005 Chung et al.
6,975,142 B2 12/2005 Azami et al.
6,975,332 B2 12/2005 Arnold et al.
6,995,519 B2 2/2006 Arnold et al.
7,027,015 B2 4/2006 Booth, Jr. et al.
7,034,793 B2 4/2006 Sekiya et al.
7,038,392 B2 5/2006 Libsch et al.
7,057,588 B2 6/2006 Asano et al.
7,061,451 B2 6/2006 Kimura
7,071,932 B2 7/2006 Libsch et al.
7,106,285 B2 9/2006 Naugler
7,112,820 B2 9/2006 Chang et al.
7,113,864 B2 9/2006 Smith et al.
7,122,835 B1 10/2006 Ikeda et al.
7,129,914 B2 10/2006 Knapp et al.
7,164,417 B2 1/2007 Cok
7,224,332 B2 5/2007 Cok
7,248,236 B2 7/2007 Nathan et al.
7,259,737 B2 8/2007 Ono et al.
7,262,753 B2 8/2007 Tanghe et al.
7,274,363 B2 9/2007 Ishizuka et al.
7,310,092 B2 12/2007 Imamura
7,315,295 B2 1/2008 Kimura
7,317,434 B2 1/2008 Lan et al.
7,321,348 B2 1/2008 Cok et al.
7,327,357 B2 2/2008 Jeong
7,333,077 B2 2/2008 Koyama et al.
7,343,243 B2 3/2008 Smith et al.
7,414,600 B2 8/2008 Nathan et al.
7,466,166 B2 12/2008 Date et al.
7,495,501 B2 2/2009 Iwabuchi et al.

(56) References Cited

U.S. PATENT DOCUMENTS 7,502,000 B2 3/2009 Yuki et al.
7,515,124 B2 4/2009 Yaguma et al.
7,535,449 B2 5/2009 Miyazawa
7,554,512 B2 6/2009 Steer
7,569,849 B2 8/2009 Nathan et al.
7,595,776 B2 * 9/2009 Hashimoto et al. ..... 345/76
7,604,718 B2 10/2009 Zhang et al.
7,609,239 B2 10/2009 Chang
7,612,745 B2 11/2009 Yumoto et al.
7,619,594 B2 11/2009 Hu
7,619,597 B2 11/2009 Nathan et al.
7,639,211 B2 12/2009 Miyazawa
7,683,899 B2 3/2010 Hirakata et al.
7,688,289 B2 3/2010 Abe et al.
7,692,641 B2 4/2010 Kudo et al.
7,760,162 B2 7/2010 Miyazawa
7,808,008 B2 10/2010 Miyake
7,859,520 B2 12/2010 Kimura
7,889,159 B2 2/2011 Nathan et al.
7,903,127 B2 * 3/2011 Kwon ..... 345/690
7,920,116 B2 * 4/2011 Woo et al. ..... 345/89
7,944,414 B2 5/2011 Shirasaki et al.
7,978,170 B2 7/2011 Park et al.
7,989,392 B2 8/2011 Crockett et al.
7,995,008 B2 8/2011 Miwa
8,063,852 B2 11/2011 Kwak et al.
8,102,343 B2 1/2012 Yatabe
8,144,081 B2 3/2012 Miyazawa
8,159,007 B2 4/2012 Barna et al.
8,242,979 B2 8/2012 Anzai et al.
8,253,665 B2 8/2012 Nathan et al.
8,319,712 B2 11/2012 Nathan et al.
2001/0002703 A1 6/2001 Koyama
2001/0009283 A1 7/2001 Arao et al.
2001/0026257 A1 10/2001 Kimura
2001/0030323 A1 10/2001 Ikeda
2001/0040541 A1 11/2001 Yoneda et al.
2001/0043173 A1 11/2001 Troutman
2001/0045929 A1 11/2001 Prache
2001/0052940 A1 12/2001 Hagihara et al.
2002/0000576 A1 1/2002 Inukai
2002/0011796 A1 1/2002 Koyama
2002/0011799 A1 1/2002 Kimura
2002/0012057 A1 1/2002 Kimura
2002/0030190 A1 3/2002 Ohtani et al.
2002/0047565 A1 4/2002 Nara et al.
2002/0052086 A1 5/2002 Maeda
2002/0080108 A1 6/2002 Wang
2002/0084463 A1 7/2002 Sanford et al.
2002/0101172 A1 8/2002 Bu
2002/0117722 A1 8/2002 Osada et al.
2002/0140712 A1 * 10/2002 Ouchi et al. ..... 345/690
2002/0158587 A1 10/2002 Komiya
2002/0158666 A1 10/2002 Azami et al.
2002/0158823 A1 10/2002 Zavracky et al.
2002/0171613 A1 * 11/2002 Goto et al. ..... 345/87
2002/0186214 A1 12/2002 Siwinski
2002/0190971 A1 12/2002 Nakamura et al.
2002/0195967 A1 12/2002 Kim et al.
2002/0195968 A1 12/2002 Sanford et al.
2003/0001828 A1 1/2003 Asano
2003/0020413 A1 1/2003 Oomura
2003/0030603 A1 2/2003 Shimoda
2003/0062524 A1 4/2003 Kimura
2003/0062844 A1 4/2003 Miyazawa
2003/0076048 A1 4/2003 Rutherford
2003/0090445 A1 5/2003 Chen et al.
2003/0090447 A1 5/2003 Kimura
2003/0090481 A1 5/2003 Kimura
2003/0095087 A1 5/2003 Libsch
2003/0098829 A1 5/2003 Chen et al.
2003/0107560 A1 6/2003 Yumoto et al.
2003/0107561 A1 6/2003 Uchino et al.
2003/0111966 A1 6/2003 Mikami et al.
2003/0112205 A1 6/2003 Yamada
2003/0112208 A1 6/2003 Okabe et al.
2003/0117348 A1 6/2003 Knapp et al.
2003/0122474 A1 7/2003 Lee
2003/0122747 A1 7/2003 Shannon et al.
2003/0128199 A1 7/2003 Kimura
2003/0151569 A1 8/2003 Lee et al.
2003/0156104 A1 8/2003 Morita
2003/0169241 A1 * 9/2003 LeChevalier ..... 345/204
2003/0169247 A1 9/2003 Kawabe et al.
2003/0179626 A1 9/2003 Sanford et al.
2003/0185438 A1 10/2003 Osawa et al.
2003/0189535 A1 10/2003 Matsumoto et al.
2003/0197663 A1 10/2003 Lee et al.
2003/0214465 A1 11/2003 Kimura
2003/0227262 A1 12/2003 Kwon
2003/0230141 A1 12/2003 Gilmour et al.
2003/0230980 A1 12/2003 Forrest et al.
2004/0004589 A1 1/2004 Shih
2004/0032382 A1 2/2004 Cok et al.
2004/0041750 A1 3/2004 Abe
2004/0066357 A1 4/2004 Kawasaki
2004/0070557 A1 4/2004 Asano et al.
2004/0129933 A1 7/2004 Nathan et al.
2004/0130516 A1 * 7/2004 Nathan et al. ..... 345/82
2004/0135749 A1 7/2004 Kondakov et al.
2004/0145547 A1 7/2004 Oh
2004/0150595 A1 8/2004 Kasai
2004/0155841 A1 8/2004 Kasai
2004/0171619 A1 9/2004 Libsch et al.
2004/0174349 A1 9/2004 Libsch
2004/0174354 A1 9/2004 Ono
2004/0183759 A1 9/2004 Stevenson et al.
2004/0189627 A1 9/2004 Shirasaki et al.
2004/0196275 A1 10/2004 Hattori
2004/0227697 A1 11/2004 Mori
2004/0239696 A1 12/2004 Okabe
2004/0251844 A1 12/2004 Hashido et al.
2004/0252085 A1 12/2004 Miyagawa
2004/0252089 A1 12/2004 Ono et al.
2004/0256617 A1 12/2004 Yamada et al.
2004/0257353 A1 12/2004 Imamura et al.
2004/0257355 A1 12/2004 Naugler
2004/0263437 A1 12/2004 Hattori
2005/0007357 A1 1/2005 Yamashita et al.
2005/0052379 A1 * 3/2005 Waterman ..... 345/87
2005/0057459 A1 3/2005 Miyazawa
2005/0067970 A1 3/2005 Libsch et al.
2005/0067971 A1 3/2005 Kane
2005/0083270 A1 4/2005 Miyazawa
2005/0110420 A1 5/2005 Arnold et al.
2005/0110727 A1 * 5/2005 Shin ..... 345/76
2005/0123193 A1 6/2005 Lamberg et al.
2005/0140610 A1 6/2005 Smith et al.
2005/0145891 A1 7/2005 Abe
2005/0156831 A1 7/2005 Yamazaki et al.
2005/0168416 A1 * 8/2005 Hashimoto et al. ..... 345/76
2005/0206590 A1 9/2005 Sasaki et al.
2005/0219188 A1 * 10/2005 Kawabe et al. ..... 345/94
2005/0243037 A1 11/2005 Eom et al.
2005/0248515 A1 11/2005 Naugler et al.
2005/0258867 A1 11/2005 Miyazawa
2005/0285825 A1 12/2005 Eom et al.
2006/0012311 A1 1/2006 Ogawa
2006/0038750 A1 2/2006 Inoue et al.
2006/0038758 A1 2/2006 Routley et al.
2006/0038762 A1 2/2006 Chou
2006/0044236 A1 3/2006 Kim
2006/0066533 A1 3/2006 Sato et al.
2006/0077077 A1 * 4/2006 Kwon ..... 341/50
2006/0092185 A1 5/2006 Jo et al.
2006/0125408 A1 6/2006 Nathan et al.
2006/0139253 A1 6/2006 Choi et al.
2006/0145964 A1 7/2006 Park et al.
2006/0191178 A1 8/2006 Sempel et al.
2006/0209012 A1 * 9/2006 Hagood ..... 345/109
2006/0214888 A1 9/2006 Schneider et al.
2006/0221009 A1 10/2006 Miwa
2006/0227082 A1 10/2006 Ogata et al.
2006/0232522 A1 10/2006 Roy et al.

(56) References Cited

U.S. PATENT DOCUMENTS

| | | | | |
|---|---|---|---|---|
| 2006/0244391 | A1 | 11/2006 | Shishido et al. | |
| 2006/0244697 | A1 | 11/2006 | Lee et al. | |
| 2006/0261841 | A1 | 11/2006 | Fish | |
| 2006/0290614 | A1 | 12/2006 | Nathan et al. | |
| 2007/0001939 | A1* | 1/2007 | Hashimoto et al. | 345/76 |
| 2007/0001945 | A1 | 1/2007 | Yoshida et al. | |
| 2007/0008251 | A1 | 1/2007 | Kohno et al. | |
| 2007/0008297 | A1 | 1/2007 | Bassetti | |
| 2007/0035489 | A1 | 2/2007 | Lee | |
| 2007/0035707 | A1 | 2/2007 | Margulis | |
| 2007/0040773 | A1* | 2/2007 | Lee et al. | 345/77 |
| 2007/0040782 | A1 | 2/2007 | Woo et al. | |
| 2007/0063932 | A1 | 3/2007 | Nathan et al. | |
| 2007/0080908 | A1 | 4/2007 | Nathan et al. | |
| 2007/0085801 | A1 | 4/2007 | Park et al. | |
| 2007/0109232 | A1 | 5/2007 | Yamamoto et al. | |
| 2007/0128583 | A1 | 6/2007 | Miyazawa | |
| 2007/0164941 | A1 | 7/2007 | Park et al. | |
| 2007/0182671 | A1 | 8/2007 | Nathan et al. | |
| 2007/0236430 | A1 | 10/2007 | Fish | |
| 2007/0241999 | A1 | 10/2007 | Lin | |
| 2007/0242008 | A1 | 10/2007 | Cummings | |
| 2008/0001544 | A1 | 1/2008 | Murakami et al. | |
| 2008/0043044 | A1* | 2/2008 | Woo et al. | 345/690 |
| 2008/0048951 | A1 | 2/2008 | Naugler et al. | |
| 2008/0055134 | A1 | 3/2008 | Li et al. | |
| 2008/0088549 | A1 | 4/2008 | Nathan et al. | |
| 2008/0094426 | A1 | 4/2008 | Kimpe | |
| 2008/0122819 | A1 | 5/2008 | Cho et al. | |
| 2008/0074360 | A1 | 6/2008 | Lu et al. | |
| 2008/0129906 | A1 | 6/2008 | Lin et al. | |
| 2008/0228562 | A1 | 9/2008 | Smith et al. | |
| 2008/0231641 | A1 | 9/2008 | Miyashita | |
| 2008/0265786 | A1 | 10/2008 | Koyama | |
| 2008/0290805 | A1 | 11/2008 | Yamada et al. | |
| 2009/0009459 | A1 | 1/2009 | Miyashita | |
| 2009/0015532 | A1 | 1/2009 | Katayama et al. | |
| 2009/0058789 | A1 | 3/2009 | Hung et al. | |
| 2009/0121988 | A1 | 5/2009 | Feng et al. | |
| 2009/0146926 | A1 | 6/2009 | Sung et al. | |
| 2009/0153448 | A1 | 6/2009 | Tomida et al. | |
| 2009/0153459 | A9 | 6/2009 | Han et al. | |
| 2009/0174628 | A1 | 7/2009 | Wang et al. | |
| 2009/0201230 | A1 | 8/2009 | Smith | |
| 2009/0201281 | A1 | 8/2009 | Routley et al. | |
| 2009/0251486 | A1 | 10/2009 | Sakakibara et al. | |
| 2009/0278777 | A1 | 11/2009 | Wang et al. | |
| 2009/0289964 | A1 | 11/2009 | Miyachi | |
| 2010/0039451 | A1 | 2/2010 | Jung | |
| 2010/0039453 | A1 | 2/2010 | Nathan et al. | |
| 2010/0207920 | A1 | 8/2010 | Chaji et al. | |
| 2010/0225634 | A1 | 9/2010 | Levey et al. | |
| 2010/0251295 | A1 | 9/2010 | Amento et al. | |
| 2010/0269889 | A1 | 10/2010 | Reinhold et al. | |
| 2010/0277400 | A1 | 11/2010 | Jeong | |
| 2010/0315319 | A1 | 12/2010 | Cok et al. | |
| 2011/0050741 | A1 | 3/2011 | Jeong | |
| 2011/0069089 | A1 | 3/2011 | Kopf et al. | |
| 2012/0299976 | A1 | 11/2012 | Chen et al. | |

FOREIGN PATENT DOCUMENTS

| | | | |
|---|---|---|---|
| CA | 1 294 034 | | 1/1992 |
| CA | 2 249 592 | | 7/1998 |
| CA | 2 303 302 | | 3/1999 |
| CA | 2303302 | A1 | 3/1999 |
| CA | 2 368 386 | | 9/1999 |
| CA | 2 242 720 | | 1/2000 |
| CA | 2 354 018 | | 6/2000 |
| CA | 2 432 530 | | 7/2002 |
| CA | 2 436 451 | | 8/2002 |
| CA | 2 507 276 | | 8/2002 |
| CA | 2 463 653 | | 1/2004 |
| CA | 2 498 136 | | 3/2004 |
| CA | 2 522 3 96 | | 11/2004 |
| CA | 2 438 363 | | 2/2005 |
| CA | 2 443 206 | | 3/2005 |
| CA | 2 519 097 | | 3/2005 |
| CA | 2 472 671 | | 12/2005 |
| CA | 2 523 841 | | 1/2006 |
| CA | 2 567 076 | | 1/2006 |
| CA | 2 495 726 | | 7/2006 |
| CA | 2 557 713 | | 11/2006 |
| CA | 2 526 782 | C | 8/2007 |
| CA | 2 651 893 | | 11/2007 |
| CA | 2651893 | A1 | 11/2007 |
| CA | 2 672 590 | | 10/2009 |
| CA | 2672590 | A1 | 10/2009 |
| CN | 1601594 | A | 3/2005 |
| CN | 1886774 | | 12/2006 |
| DE | 202006007613 | | 9/2006 |
| EP | 0 478 186 | | 4/1992 |
| EP | 1 028 471 | A | 8/2000 |
| EP | 1 130 565 | A1 | 9/2001 |
| EP | 1 194 013 | | 4/2002 |
| EP | 1 321 922 | | 6/2003 |
| EP | 1 335 430 | A1 | 8/2003 |
| EP | 1 381 019 | | 1/2004 |
| EP | 1 429 312 | A | 6/2004 |
| EP | 1 439 520 | A2 | 7/2004 |
| EP | 1 465 143 | A | 10/2004 |
| EP | 1 473 689 | A | 11/2004 |
| EP | 1 517 290 | A2 | 3/2005 |
| EP | 1 521 203 | A2 | 4/2005 |
| GB | 2 399 935 | | 9/2004 |
| GB | 2 460 018 | | 11/2009 |
| JP | 09 090405 | | 4/1997 |
| JP | 10-254410 | | 9/1998 |
| JP | 11 231805 | | 8/1999 |
| JP | 2002-278513 | | 9/2002 |
| JP | 2003-076331 | | 3/2003 |
| JP | 2003-099000 | | 4/2003 |
| JP | 2003-173165 | | 6/2003 |
| JP | 2003-186439 | | 7/2003 |
| JP | 2003-195809 | | 7/2003 |
| JP | 2003-271095 | | 9/2003 |
| JP | 2003-308046 | | 10/2003 |
| JP | 2004-054188 | | 2/2004 |
| JP | 2004-226960 | | 8/2004 |
| JP | 2005-004147 | | 1/2005 |
| JP | 2005-099715 | | 4/2005 |
| JP | 2005-258326 | | 9/2005 |
| JP | 2005-338819 | | 12/2005 |
| TW | 569173 | | 1/2004 |
| TW | 200526065 | | 8/2005 |
| TW | 1239501 | | 9/2005 |
| WO | WO 98/11554 | | 3/1998 |
| WO | WO 99/48079 | | 9/1999 |
| WO | WO 01/27910 | A1 | 4/2001 |
| WO | WO 02/067327 | A | 8/2002 |
| WO | WO 03/034389 | | 4/2003 |
| WO | WO 03/063124 | | 7/2003 |
| WO | WO 03/075256 | | 9/2003 |
| WO | WO 2004/003877 | | 1/2004 |
| WO | WO 2004/015668 | A1 | 2/2004 |
| WO | WO 2004/034364 | | 4/2004 |
| WO | WO 2005/022498 | | 3/2005 |
| WO | WO 2005/055185 | | 6/2005 |
| WO | WO 2005/055186 | A1 | 6/2005 |
| WO | WO 2005/069267 | | 7/2005 |
| WO | WO 2005/122121 | | 12/2005 |
| WO | WO 2006/063448 | | 6/2006 |
| WO | WO 2006/128069 | | 11/2006 |
| WO | WO 2008/057369 | | 5/2008 |
| WO | WO 2008/0290805 | | 11/2008 |
| WO | WO 2009/059028 | | 5/2009 |
| WO | WO 2009/127065 | | 10/2009 |
| WO | WO 2010/066030 | | 6/2010 |
| WO | WO 2010/120733 | | 10/2010 |

OTHER PUBLICATIONS

Alexander et al.: "Unique Electrical Measurement Technology for Compensation Inspection and Process Diagnostics of AMOLED HDTV"; dated May 2010 (4 pages).

(56) References Cited

OTHER PUBLICATIONS

Chaji et al.: "A fast settling current driver based on the CCII for AMOLED displays"; dated Dec. 2009 (6 pages).
Chaji et al.: "Driving scheme for stable operation of 2-IFT a-Si AMOLED pixel"; dated Apr. 2005 (2 pages).
Chaji et al.: "eUTDSP: a design study of a new VLIW-based DSP architecture"; dated May 2003 (4 pages).
Chaji et al.: "Stable RGBW AMOLED display with OLED degradation compensation using electrical feedback"; dated Feb. 2010 (2 pages).
Chaji et al.: "Thin-Film Transistor Integration for Biomedical Imaging and AMOLED Displays"; dated May 2008 (177 pages).
Chapter 3: Color Spaces" Keith Jack: "Video Demystified: "A Handbook for the Digital Engineer" 2001 Referex ORD-0000-00-00 USA EP040425529 ISBN: 1-878707-56-6 pp. 32-33.
Chapter 8: Alternative Flat Panel Display 1-25 Technologies; Willem den Boer: "Active Matrix Liquid Crystal Display: Fundamentals and Applications" 2005 Referex ORD-0000-00-00 U.K.; XP040426102 ISBN: 0-7506-7813-5 pp. 206-209 p. 208.
European Partial Search Report Application No. 12 15 6251.6 European Patent Office dated May 30, 2012 (7 pages).
European Patent Office Communication Application No. 05 82 1114 dated Jan. 11, 2013 (9 pages).
European Patent Office Communication with Supplemental European Search Report for EP Application No. 07 70 1644.2 dated Aug. 18, 2009 (12 pages).
European Search Report Application No. 10 83 4294.0-1903 dated Apr. 8, 2013 (9 pages).
European Search Report Application No. EP 05 80 7905 dated Apr. 2, 2009 (5 pages).
European Search Report Application No. EP 05 82 1114 dated Mar. 27, 2009 (2 pages).
European Search Report Application No. EP 07 70 1644 dated Aug. 5, 2009.
European Search Report Application No. EP 10 17 5764 dated Oct. 18, 2010 (2 pages).
European Search Report Application No. EP 10 82 9593.2 European Patent Office dated May 17, 2013 (7 pages).
European SearchReport Application No. EP 12 15 6251.6 European Patent Office dated Oct. 12, 2012 (18 pages).
European Search Report Application No. EP. 11 175 225.9 dated Nov. 4, 2011 (9 pages).
European Supplementary Search Report Application No. EP 09 80 2309 dated May 8, 2011 (14 pages).
European Supplementary Search Report Application No. EP 09 83 1339.8 dated Mar. 26, 2012 (11 pages).
Extended European Search Report Application No. EP 06 75 2777.0 dated Dec. 6, 2010 (21 pages).
Extended European Search Report Application No. EP 09 73 2338.0 dated May 24, 2011 (8 pages).
Extended European Search Report Application No. EP 11 17 5223., 4 dated Nov. 8, 2011 (8 pages).
Extended European Search Report Application No. EP 12 17 4465.0 European Patent Office dated Sep. 7, 2012 (9 pages).
Fan et al. "LTPS_TFT Pixel Circuit Compensation for TFT Threshold Voltage Shift and IR-Drop On the Power Line For Amolded Displays" 5 pages copyright 2012.
Goh et al. "A New a-Si:H Thin-Film Transistor Pixel Circuit for Active-Matrix Organic Light-Emitting Diodes" IEEE Electron Device Letters vol. 24 No. Sep. 9, 2003 pp. 583-585.
International Search Report Application No. PCT/CA2005/001844 dated Mar. 28, 2006 (2 pages).
International Search Report Application No. PCT/CA2006/000941 dated Oct. 3, 2006 (2 pages).
International Search Report Application No. PCT/CA2007/000013 dated May 7, 2007.
International Search Report Application No. PCT/CA2009/001049 dated Dec. 7, 2009 (4 pages).
International Search Report Application No. PCT/CA2009/001769 dated Apr. 8, 2010.
International Search Report Application No. PCT/IB2010/002898 Canadian Intellectual Property Office dated Jul. 28, 2009 (5 pages).
International Search Report Application No. PCT/IB2010/055481 dated Apr. 7, 2011 (3 pages).
International Search Report Application No. PCT/IB2011/051103 dated Jul. 8, 2011 3 pages.
International Search Report Application No. PCT/IB2012/052651 5 pages dated Sep. 11, 2012.
International Searching Authority Written Opinion Application No. PCT/IB2010/055481 dated Apr. 7, 2011 (6 pages).
International Searching Authority Written Opinion Application No. PCT/IB2012/0526516 pages dated Sep. 11, 2012.
International Searching Authority Written Opinion Application No. PCT/IB2011/051103 dated Jul. 8, 2011 6 pages.
International Searching Authority Written Opinion Application No. PCT/IB2010/002898 Canadian Intellectual Property Office dated Mar. 30, 2011 (8 pages).
International Searching Authority Written Opinion Application No. PCT/CA2009/001769 dated Apr. 8, 2010 (8 pages).
Jafarabadiashtiani et al.: "A New Driving Method for a-Si AMOLED Displays Based on Voltage Feedback"; dated May 2005 (4 pages).
Lee et al.: "Ambipolar Thin-Film Transistors Fabricated by PECVD Nanocrystalline Silicon"; dated May 2006 (6 pages).
Ma e y et al.: "Organic Light-Emitting Diode/Thin Film Transistor Integration for foldable Displays" Conference record of the 1997 International display research conference and international workshops on LCD technology and emissive technology. Toronto Sept. 15-19, 1997 (6 pages).
Matsueda y et al.: "35.1: 2.5-in. AMOLED with Integrated 6-bit Gamma Compensated Digital Data Driver"; dated May 2004 (4 pages).
Nathan et al. "Amorphous Silicon Thin Film Transistor Circuit Integration for Organic LED Displays on Glass and Plastic" IEEE Journal of Solid-State Circuits vol. 39 No. Sep. 9, 2004 pp. 1477-1486.
Nathan et al.: "Backplane Requirements for Active Matrix Organic Light Emitting Diode Displays"; dated Sep. 2006 (16 pages).
Nathan et al.: "Call for papers second international workshop on compact thin-film transistor (TFT) modeling for circuit simulation"; dated Sep. 2009 (1 page).
Nathan et al.: "Invited Paper: a-Si for AMOLED—Meeting the Performance and Cost Demands of Display Applications (Cell Phone to HDTV)"; dated Jun. 2006 (4 pages).
Nathan et al.: "Thin film imaging technology on glass and plastic"; dated October 31-Nov. 2, 2000 (4 pages).
Ono et al. "Shared Pixel Compensation Circuit for AM-OLED Displays " Proceedings of the 9th Asian Symposium on Information Display (ASID) pp. 462-465 New Delhi dated Oct. 8-12, 2006 (4 pages).
Philipp: "Charge transfer sensing" Sensor Review vol. 19 No. 2 Dec. 31, 1999 (Dec. 31, 1999) 10 pages.
Smith, Lindsay I., "A tutorial on Principal Components Analysis," dated Feb. 26, 2001 (27 pages).
Stewart M. et al. "Polysilicon TFT technology for active matrix OLED displays" IEEE transactions on electron devices vol. 48 No. 5 May 2001 (7 pages).
Vygranenko et al.: "Stability of indium-oxide thin-film transistors by reactive ion beam assisted deposition"; dated Feb. 2009.
Yi He et al. "Current-Source a-Si:H Thin Film Transistor Circuit for Active-Matrix Organic Light-Emitting Displays" IEEE Electron Device Letters vol. 21 No. 12, Dec. 2000 pp. 590-592.
International Search Report Application No. PCT/IB2013/059074, dated Dec. 18, 2013 (5 pages).
International Searching Authority Written Opinion Application No. PCT/IB2013/059074, dated Dec. 18, 2013 (8 pages ).
Supplementary European Search Report for EP 09 80 2309, dated May 8, 20011 (14 pages).
Alexander et al.: "Pixel circuits and drive schemes for glass and elastic AMOLED displays"; dated Jul. 2005 (9 pages).
Ashtiani et al.: "AMOLED Pixel Circuit With Electronic Compensation of Luminance Degradation"; dated Mar. 2007 (4 pages).
Chaji et al.: "A Current-Mode Comparator for Digital Calibration of Amorphous Silicon AMOLED Displays"; dated Jul. 2008 (5 pages).

(56) References Cited

OTHER PUBLICATIONS

Chaji et al.: "A Low-Cost Stable Amorphous Silicon AMOLED Display with Full V~T- and V~O~L~E~D Shift Compensation"; dated May 2007 (4 pages).
Chaji et al.: "A low-power driving scheme for a-Si:H active-matrix organic light-emitting diode displays"; dated Jun. 2005 (4 pages).
Chaji et al.: "A low-power high-performance digital circuit for deep submicron technologies"; dated Jun. 2005 (4 pages).
Chaji et al.: "A novel a-Si:H AMOLED pixel circuit based on short-term stress stability of a-Si:H TFTs"; dated Oct. 2005 (3 pages).
Chaji et al.: "A Novel Driving Scheme and Pixel Circuit for AMOLED Displays"; dated Jun. 2006 (4 pages).
Chaji et al.: "A novel driving scheme for high-resolution large-area a-Si:H AMOLED displays"; dated Aug. 2005 (4 pages).
Chaji et al.: "A Stable Voltage-Programmed Pixel Circuit for a-Si:H AMOLED Displays"; dated Dec. 2006 (12 pages).
Chaji et al.: "A Sub-μA fast-settling current-programmed pixel circuit for AMOLED displays"; dated Sep. 2007.
Chaji et al.: "An Enhanced and Simplified Optical Feedback Pixel Circuit for AMOLED Displays"; dated Oct. 2006.
Chaji et al.: "Compensation technique for DC and transient instability of thin film transistor circuits for large-area devices"; dated Aug. 2008.
Chaji et al.: "Driving scheme for stable operation of 2-TFT a-Si AMOLED pixel"; dated Apr. 2005 (2 pages).
Chaji et al.: "Dynamic-effect compensating technique for stable a-Si:H AMOLED displays"; dated Aug. 2005 (4 pages).
Chaji et al.: "Electrical Compensation of OLED Luminance Degradation"; dated Dec. 2007 (3 pages).
Chaji et al.: "Fast and Offset-Leakage Insensitive Current-Mode Line Driver for Active Matrix Displays and Sensors"; dated Feb. 2009 (8 pages).
Chaji et al.: "High Speed Low Power Adder Design With A New Logic Style: Pseudo Dynamic Logic (SDL)"; dated Oct. 2001 (4 pages).
Chaji et al.: "High-precision, fast current source for large-area current-programmed a-Si flat panels"; dated Sep. 2006 (4 pages).
Chaji et al.: "Low-Cost AMOLED Television with IGNIS Compensating Technology"; dated May 2008 (4 pages).
Chaji et al.: "Low-Cost Stable a-Si:H AMOLED Display for Portable Applications"; dated Jun. 2006 (4 pages).
Chaji et al.: "Low-Power Low-Cost Voltage-Programmed a-Si:H AMOLED Display"; dated Jun. 2008 (5 pages).
Chaji et al.: "Merged phototransistor pixel with enhanced near infrared response and flicker noise reduction for biomolecular imaging"; dated Nov. 2008 (3 pages).
Chaji et al.: "Parallel Addressing Scheme for Voltage-Programmed Active-Matrix OLED Displays"; dated May 2007 (6 pages).
Chaji et al.: "Pseudo dynamic logic (SDL): a high-speed and low-power dynamic logic family"; dated 2002 (4 pages).
Chaji et al.: "Stable a-Si:H circuits based on short-term stress stability of amorphous silicon thin film transistors"; dated May 2006 (4 pages).
Chaji et al.: "Stable Pixel Circuit for Small-Area High- Resolution a-Si:H AMOLED Displays"; dated Oct. 2008 (6 pages).
Chaji et al.: "Thin-Film Transistor Integration for Biomedical Imaging and AMOLED Displays"; dated 2008 (177 pages).
Jafarabadiashtiani et al.: "A New Driving Method for a-Si AMOLED Displays Based on Voltage Feedback"; dated 2005 (4 pages).
Lee et al.: "Ambipolar Thin-Film Transistors Fabricated by PECVD Nanocrystalline Silicon"; dated 2006 (6 pages).
Nathan et al.: "Driving schemes for a-Si and LTPS AMOLED displays"; dated Dec. 2005 (11 pages).
Rafati et al.: "Comparison of a 17 b multiplier in Dual-rail domino and in Dual-rail D L (D L) logic styles"; dated 2002 (4 pages).
Safavaian et al.: "Three-TFT image sensor for real-time digital X-ray imaging"; dated Feb. 2, 2006 (2 pages).
Safavian et al.: "3-TFT active pixel sensor with correlated double sampling readout circuit for real-time medical x-ray imaging"; dated Jun. 2006 (4 pages).
Safavian et al.: "A novel current scaling active pixel sensor with correlated double sampling readout circuit for real time medical x-ray imaging"; dated May 2007 (7 pages).
Safavian et al.: "A novel hybrid active-passive pixel with correlated double sampling CMOS readout circuit for medical x-ray imaging"; dated May 2008 (4 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).
Vygranenko et al.: "Stability of indium-oxide thin-film transistors by reactive ion beam assisted deposition"; dated 2009.
Wang et al.: "Indium oxides by reactive ion beam assisted evaporation: From material study to device application"; dated Mar. 2009 (6 pages).

* cited by examiner

| | | | | | |
|---|---|---|---|---|---|
| Red | Green | Blue | Red | Green | Blue |

FIG. 6

METHOD AND SYSTEM FOR DRIVING LIGHT EMITTING DISPLAY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 8,471,875. This application is a reissue continuation of application Ser. No. 14/477,037, which is an application for reissue of U.S. Pat. No. 8,471, 875.*

FIELD OF INVENTION

The present invention relates to a display system, more specifically to a method and system for driving light emitting displays.

BACKGROUND OF THE INVENTION

A display device having a plurality of pixels (or subpixels) arranged in a matrix has been widely used in various applications. Such a display device includes a panel having the pixels and peripheral circuits for controlling the panels. Typically, the pixels are defined by the intersections of scan lines and data lines, and the peripheral circuits include a gate driver for scanning the scan lines and a source driver for supplying image data to the data lines. The source driver may include gamma corrections for controlling gray scale of each pixel. In order to display a frame, the source driver and the gate driver respectively provide a data signal and a scan signal to the corresponding data line and the corresponding scan line. As a result, each pixel will display a predetermined brightness and color.

In recent years, the matrix display has been widely employed in small electronic devices, such as handheld devices, cellular phones, personal digital assistants (PDAs), and cameras. However, the conversional scheme and structure of the source driver and the gate driver demands the large number of elements (e.g., resistors, switchers, and operational amplifiers), resulting that the layout area of the peripheral circuits is still large and expensive.

Therefore there is a need to provide a display driver that can reduce a driver die area and thus cost, without reducing the driver performance.

SUMMARY OF THE INVENTION

It is an object of the invention to provide a method and system that obviates or mitigates at least one of the disadvantages of existing systems.

According to an embodiment of this disclosure, there is provided a display system, which includes: a driver for operating a panel having a plurality of pixels arranged by a plurality of first lines and at least one second line, the driver having: a driver output unit for providing to the panel a single driver output for activating the plurality of first lines, the single driver output being demultiplexed on the panel to activate each first line.

According to an embodiment of this disclosure, there is provided a display system, which includes: a driver for operating a panel having a plurality of pixels arranged by a plurality of data lines and at least one scan line, the driver having: a shift register unit including a plurality of shift registers; a latch and shift register unit including a plurality of latch and shift circuits for the plurality of shift registers, each storing an image signal from the corresponding shift register or shifting the image signal to a next latch and shift circuit; and a decoder unit including at least one decoder coupled to one of the latch and shift circuits, for decoding the image signal latched in the one of the latch and shift circuit to provide a driver output.

According to an embodiment of this disclosure, there is provided a display system, which includes: a driver for operating a panel having a plurality of pixels, the driver having: a plurality of multiplexers for a plurality of offset gamma curve sections, each offset gamma curve section having a first range less than a second range of a main gamma curve, at least one of offset gamma curve sections being offset by a predetermined voltage from a corresponding section of the main gamma curve; a plurality of decoders for the plurality of multiplexers; and an output buffer for providing a driver output based on the output from the decoder and the predetermined voltage.

BRIEF DESCRIPTION OF THE DRAWINGS

These and other features of the invention will become more apparent from the following description in which reference is made to the appended drawings wherein:

FIG. 6 illustrates an example of operation for the display system having RGB pixel structure;

DETAILED DESCRIPTION

One or more currently preferred embodiments have been described by way of example. It will be apparent to persons skilled in the art that a number of variations and modifications can be made without departing from the scope of the invention as defined in the claims.

Embodiments in this disclosure are described using a panel having pixels that are coupled to at least first line and at least one second line (e.g., scan lines and data lines) and being operated by a driver. The driver may be a driver IC having a plurality of pins, e.g., source driver ICs, gate driver ICs. The panel may be, for example, but not limited to, a LCD or LED panel. The panel may be a color panel or a monochrome panel.

In the description below, the terms "source driver" and "data driver" are used interchangeably, and the terms "gate driver" and "address driver" are used interchangeably. In the description below, the terms "row", "scan line" and "address line" may be used interchangeably. In the description below, the terms "column", "data line" and "source line" may be used interchangeably. In the description below, the terms "pixel" and "subpixel" may be used interchangeably.

Figure 1A:
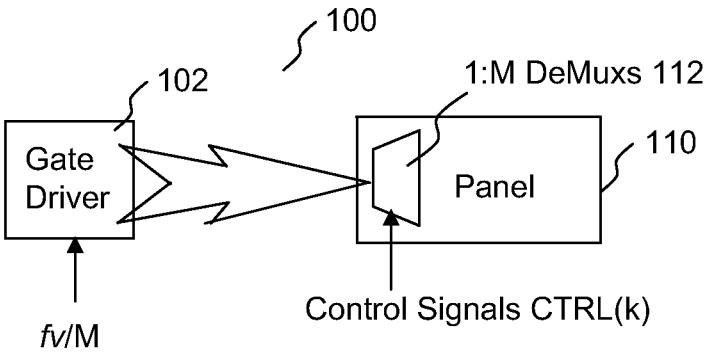
FIG. 1A illustrates a gate driver and a panel for a display system.
Figure 1B:
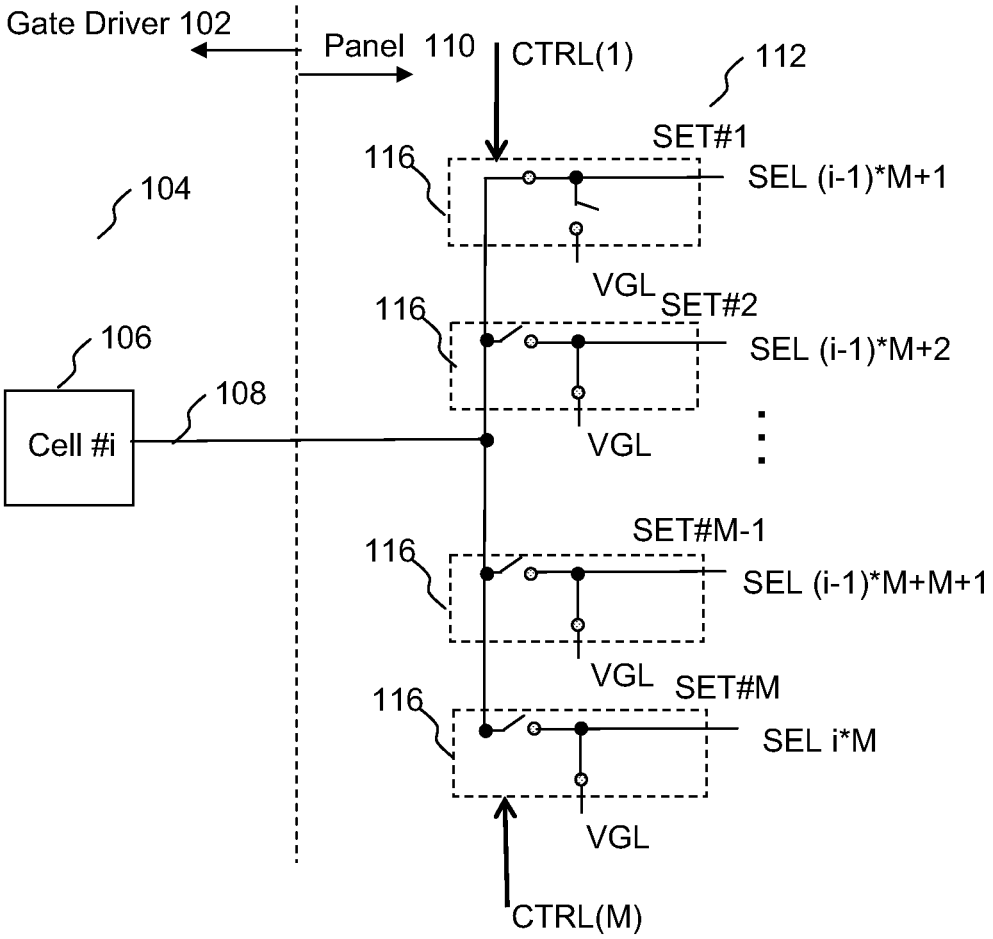
FIG. 1B illustrates an example of the gate driver and the panel of FIG. 1A.

Referring to FIGS. 1A-1B, there is illustrated a system 100 having a gate driver 102 and a panel 110 having pixels arranged in rows and columns. The system 100 includes a mechanism for multiplexing (muxing) gate driver outputs based on frequency reduction. In FIG. 1A, "fv" represents the vertical frequency of the display (or row frequency), and "M" is the number of muxing blocks. In FIG. 1B, "Cell #i" represents an address cell 106, and "SEL k" (k=(i−1)*M+1, (i−1)*M+2, . . . , (i−1)*M+M+1, i*M) represents a row or a scan line coupled to the row of the panel 110. A pixel in the row is selected by the scan line. The address cell 106 may be a logic or a flip-flop in a shift register chain to output a gate output.

The gate driver 102 includes a driver output unit 104 having at least one address cell 106 (Cell #i). The address cell 106 provides a single gate driver output 108 which is shared by M rows. An individual gate driver output 108 from the gate driver 102 is active for M rows. On the panel side 110, a demultiplexer 112 ("1:M Demuxs" in FIG. 1A) is employed for M rows. The input of the demultiplexer 112 is coupled to the gate driver output 108, and the outputs of the demultiplexer 112 are coupled to M rows. In this example, the demultiplexer 112 is coupled to scan lines SEL (i−1)*M+1, SEL (i−1)*M+2, . . . , and SEL i*M. The activated gate driver output 108 from the address cell 106 (Cell #i) is assigned to each individual row in sequence, via the demultiplexer 112.

The demultiplexer 112 is implemented using, for example, thin film transistors, on the panel 110. The demultiplexer 112 includes a plurality of switch blocks for activating M rows. In FIG. 1B, switches 116 (SET #1, SET #2, . . . , SET #M) are shown as an example of the components of the demultiplexer 112. The switch block 116 (SET #k: k=1, 2, . . . , M) is employed for the scan line SEL (i−1)*M+k. Each switch block 116 includes a pair of switches, one being capable of connecting the gate driver output 108 to the corresponding scan line and the other being capable of connecting VGL to the corresponding scan line. VGL may be a ground level voltage. Each scan line SEL (i−1)*M+k turns to be on the VGL level or the activated gate driver output 108 via the corresponding switch block 116 (SET #k). Each switch block 116 (SET #k) is controlled by the corresponding control signal CTRL (k). In FIG. 3B, the scan line SEL (i−1)*M+k is selected (becomes active) by the control signal CTRL (k). By operating the demultiplexer 112 with the control signals CTRL (1)-CTRL (M), the number of the gate driver outputs and address cells is reduced by a factor of M.

In FIG. 1B, one address cell 116 is shown as an element of the driver output unit 104; however, the number of the address cells may vary. In FIG. 1B, M rows (scan lines) are shown; however, the panel 110 may include a plurality of groups of rows where the ith group has M rows and is operated by the ith address cell (Cell #i). One of ordinary skill in the art would appreciate that the gate driver 102 and the panel 110 may include components not shown in the FIGS. 1A-1B.

Figure 2:
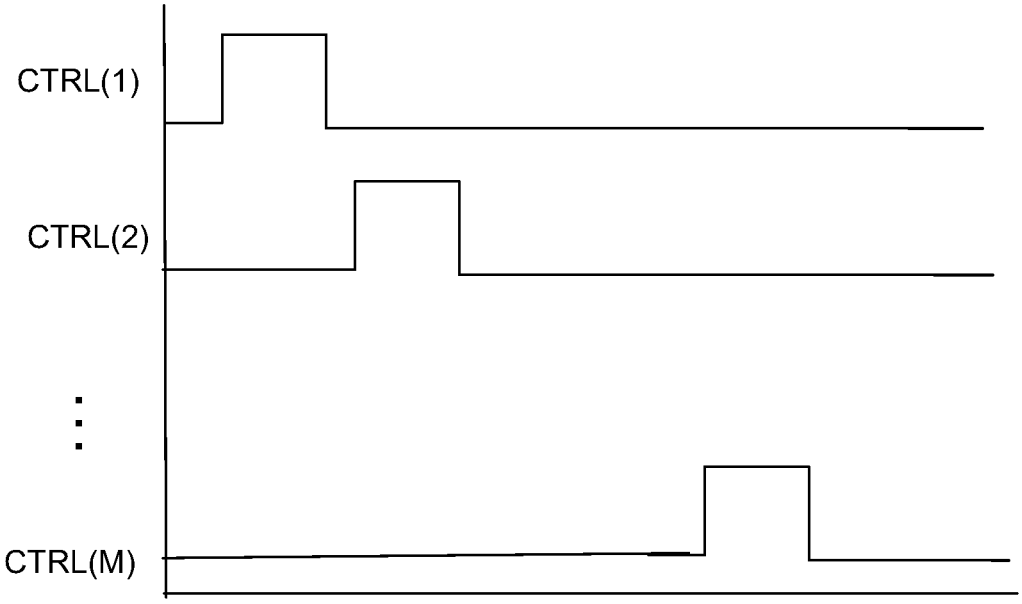
FIG. 2 illustrates a timing chart for operating the display system of FIGS. 1A-1B.

Referring to FIGS. 1A, 1B and 2, the operation of a display having the gate driver 102 and the panel 110 is described. Each of the controlling signals CTRL (1)-CTRL (M) for controlling the demultiplexing on the panel 110 works at the normal gate frequency. When the display programming reaches the row SEL (i−1)*M+1, the control signal CTRL (1) for that row is high, resulting that the address cell 106 for the ith block (Cell #i) of rows is connected to SEL (i−1)*M+1. Thus, that row SEL (i−1)*M+1 is selected and the image data can be written in the pixels of the row.

After the programming of the row SEL (i−1)*M+1, the next control signal CTRL (2) is high, resulting that the next row SEL (i−1)*M+2 becomes active. This continues till the entire display is programmed (end of a frame).

If a row is not active, the control signal related to that row is low or the address cell related to that row is not active. Thus, the row is connected to VGL which will disconnect the pixels in that row from the gate driver 102.

Figure 3A:
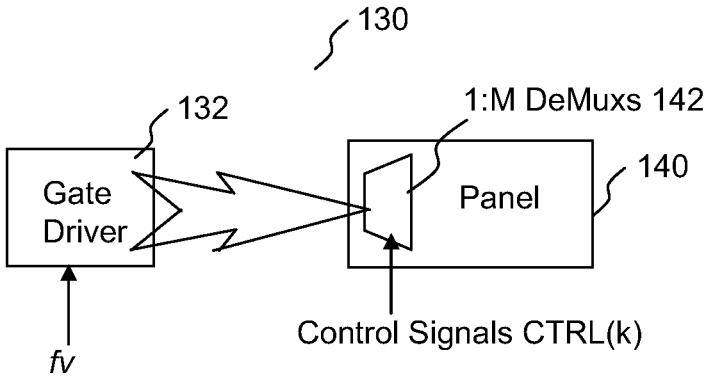
FIG. 3A illustrates another example of a gate driver and a panel for a display system.
Figure 3B:
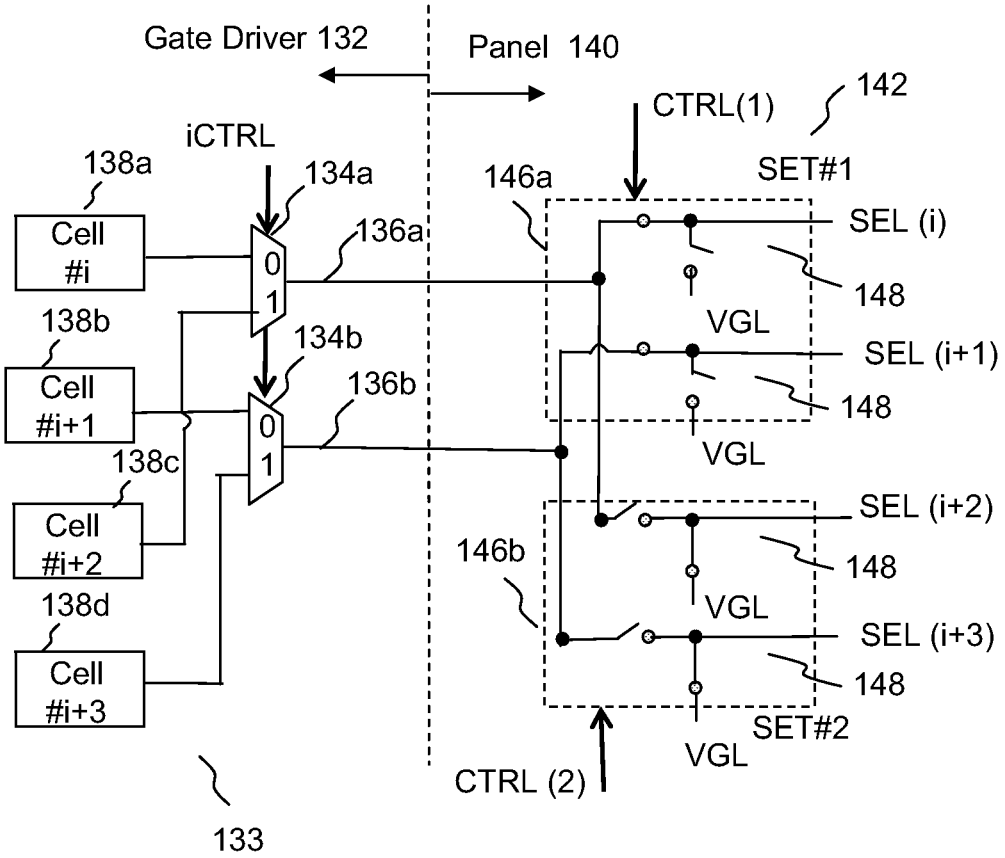
FIG. 3B illustrates an example of the gate driver and the panel of FIG. 3A.

Referring to FIGS. 3A-3B, there is illustrated a system 130 having a gate driver 132 and a panel 140 having pixels arranged in rows and columns. The system 130 has a mechanism for reducing the number of gate driver outputs and reducing the operation frequency of demultiplexing control signals on the panel side. In FIG. 3A, "fv" represents the vertical frequency of the display (or row frequency). In FIG. 3B, "Cell #j" (j=i, i+1, i+2, i+3) represents an address cell, and "SEL k" (k=i, i+1, i+2, i+3) represents a row or a scan line coupled to the row of the panel 140. A pixel in the row is selected by the scan line. The address cell may be a logic or a flip-flop in a shift register chain to output a gate output.

In the system 130, gate driver output signals are multiplexed on the gate driver 132 side, and the outputs from the gate driver 132 are demultiplexed on the panel 140 side.

The gate driver 132 includes a driver output unit 133 having a plurality of multiplexers for a plurality of address cells. Each address cell provides a gate driver signal, and each multiplexer multiplexing the gate driver signals and outputs a single gate driver output. In FIG. 3B, four address cells 138a-138d (Cell #i, Cell #i+1, Cell #i+2, and Cell #i+3) are shown as an example of the address cells in the gate driver 132. In FIG. 3B, two multiplexers 134a and 134b are shown as an example of multiplexing the gate driver signals. The multiplexers 134a and 134b are controlled by a control signal iCTRL. The multiplexer 134a is coupled to the address cells 138a and 138c (Cell #i and Cell #i+2) and outputs a gate output signal 136a that corresponds to either address cell 138a or 138c (Cell #i or Cell #i+2). The multiplexer 134b is coupled to the address cells 138b and 138d (Cell #i+1 and Cell #i+3) and outputs a gate output signal 136b that corresponds to either address cell 138b or 138d (Cell #i+1 or Cell #i+3).

The panel 140 includes a multiplexer 142 ("1:M Demuxs" in FIG. 3A) coupling to the gate driver outputs and a plurality of rows. The demultiplexer 142 is implemented using, for example, thin film transistors, on the panel 140. The demultiplexer 142 includes a plurality of switch group blocks, each coupling to the gate driver multiplexers. In FIG. 3B, two switch group blocks 146a and 146b (SET #1 and SET #2) are shown as an example of the components of the demultiplexer 142. On the panel side 140, the activated gate driver outputs 136a and 136b are assigned of the switch group blocks 146a and 146b.

Each switch group block in the panel 140 includes a plurality of switch blocks 148. In FIG. 3B, each of the switch group blocks 146a and 146b includes two switch blocks 148, one being capable of coupling one gate driver output 136a to one scan line and the other being capable of coupling the other gate driver output 136b to the other scan line. The switch block 148 includes a pair of switches, one being capable of coupling the gate driver output to the corresponding scan line and the other being capable of coupling VGL to the corresponding scan line. VGL may be a ground level voltage. The switch block 148 in the switch group block (SET #k: k=1, 2, . . .) is controlled by the corresponding control signal CTRL (k). Each scan line turns to be on the VGL level or the corresponding activated gate driver output 136a or 136b via the corresponding switch block 148. In FIG. 3B, the scan lines SEL (i) and SEL (i+1) are selected (become active) by the control signal CTRL (1), and the scan lines SEL (i+2) and SEL (i+3) are selected (become active) by the control signal CTRL (2).

In FIG. 3B, the multiplexing (muxing) and demultiplexing (demuxing) operations are executed for two rows, however, the multiplexing and demultiplexing operations may be executed for more than two rows. In FIG. 3B, four address cells are shown as an element of the driver output unit 133; however, the number of the address cells is not limited to four and may vary. In FIG. 3B, rows (scan lines) are divided into two groups, each having two rows; however, the number of groups and the number of rows in each group are not limited to two and may vary. One of ordinary skill in the art would appreciate that the gate driver 132 and the panel 140 may include components not shown in the FIGS. 3A-3B.

In this structure, the physical multiplexing is used at the gate driver side 132. As a result, the number of address cells remains the same while the number of gate driver outputs is reduced by a factor of multiplexing blocks. The number of rows in each set (SET #k) can be increased for further reduction in output of the gate driver and the frequency of the control signals. Since multiple gate driver outputs can be active, the operation frequency of the demultiplexing control signals is reduced.

Figure 4:
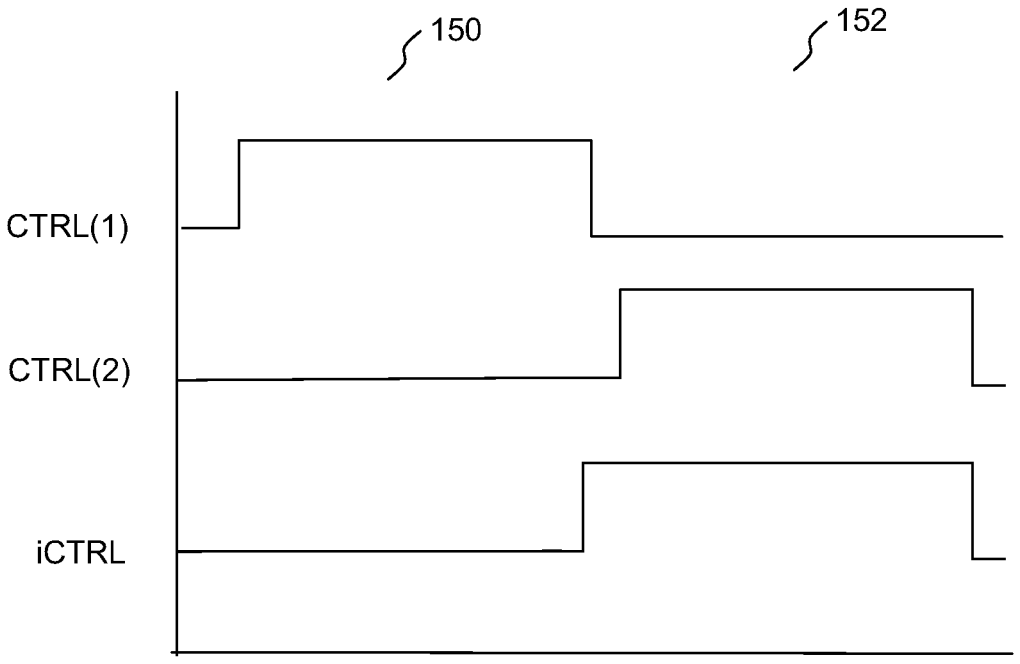
FIG. 4 illustrates a timing chart for operating the display system of FIGS. 3A-3B.

Referring to FIGS. 3A, 3B and 4, the operation of a display having the gate driver 132 and the panel 140 is described. When the display programming reaches the rows SEL (i) and SEL (i+1), the control signal CTRL (1) for those rows is high (150), resulting that the gate driver output 136a is coupled to the row SEL (i) and the gate driver output 136b is coupled to the row SEL (i+1). At this period (150), the control signal iCTRL is in one state (e.g., low). The gate driver output 136a corresponds to the output from the address cell 138a (Cell #i) and the gate driver output 136b corresponds to the output from the address cell 138b (Cell #i+1). The image data can be written in the pixels of the selected rows SEL (i) and SEL (i+1).

After the programming of the rows SEL (i) and SEL (i+1), the next control signal CTRL (2) is high (152), resulting that the next rows SEL (i+2) and SEL (i+3) become active. At this period (152), the control signal iCTRL is in the other state (e.g., high). The gate driver output 136a corresponds to the output from the address cell 138c (Cell #i+2) and the gate driver output 136b corresponds to the output from the address cell 138d (Cell #i+3). The image data can be written in the pixels of the selected rows SEL (i+2) and SEL (i+3). This continues till the entire display is programmed (end of a frame).

If a row is not active, the control signal related to that row is low or the address cell related to that row is not active. Thus, the row is connected to VGL which will disconnect the pixels in that row from the gate driver 132.

Figure 5:
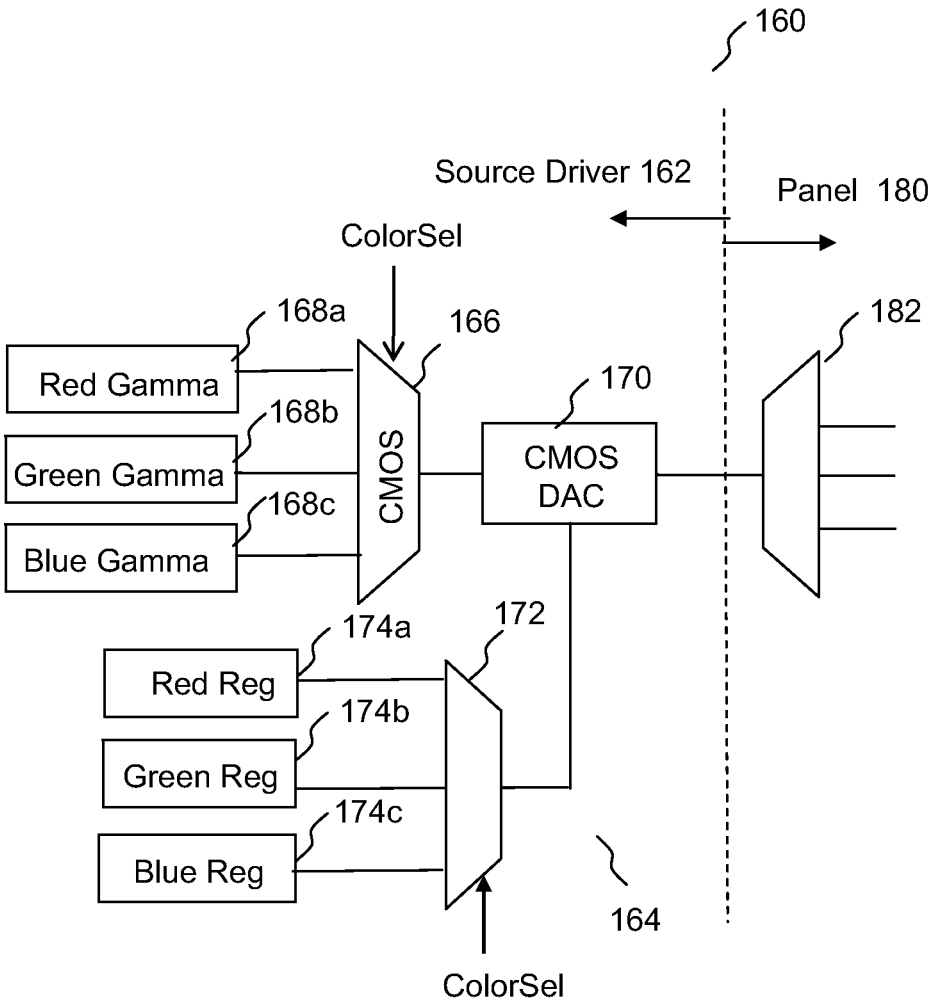
FIG. 5 illustrates an example of a source driver and a panel for a display system.

Referring to FIG. 5, there is illustrated a system 160 having a source driver 162 and a panel 180 having subpixels for RGB. Most of light emitting displays employ different gammas (or gamma corrections) for different subpixels, which use different decoders for different outputs. In the system 160, gammas (gamma corrections, gamma voltages) are multiplexed on the source driver 162 side. In the description, the terms "gamma", "gamma correction" and "gamma voltages" may be used interchangeably. One of ordinary skill in the art would appreciate that the source driver 162 and the panel 180 may include components not shown in FIG. 5.

The source driver 162 includes a driver output unit 164 having a CMOS multiplexer 166 and a CMOS digital to analog converter (DAC) 170. The multiplexer 166 multiplexes a Red gamma correction 168a, a Green gamma correction 168b and a Blue gamma correction 168c. The DAC 170 includes a decoder. In the description, the terms "DAC" and "DAC decoder" may be used interchangeably.

Each of the gamma corrections 168a, 168b and 168c provides a reference voltage to the DAC 170. The reference voltage is selected based on the dynamic range of the DAC decoder 170. The reference voltage at the gamma correction block may be generated using, for example, resistors, or be stored using, for example, registers.

The output from the multiplexer 166 is provided to the DAC 170. The multiple gammas share one decoder in the DAC 170. The DAC decoder 170 operates on an output from a multiplexer 172. The multiplexer 172 multiplexes a Red register (reg) 174a for storing image data for Red, a Green register (reg) 174b for storing image data for Green, and a Blue register (reg) 174c for storing image data for Blue. The CMOS DAC 170 provides a single source driver output 174.

A demultiplexer 182 is employed on the panel 180 side to demultiplex the driver output 174 from the source driver 162. The demultiplexer 182 is implemented using, for example, thin film transistors, on the panel 180. The outputs from the demultiplexer 182 are couples to three data lines. The driver output 174 is demultiplexed 182 on the panel 180 side and goes to different subpixels (i.e., Red subpixel, Blue subpixel and Green subpixel).

In the system 160, the output of the source driver 162 is multiplexed to reduce the number of driver pins and demultiplexed at the panel 180. To further improve the size of the driver area, the multiplexing is executed at few stage earlier at the gamma selection and DAC inputs. For example, when, the Red pixels are being programmed at the panel 180, the Red data (Red register 174a) and the red gamma 168a are assigned to the DAC 170.

The multiplexers 166 and 172 may be controlled by a color selection control signal ColorSel. The demultiplexer 182 may be controlled by the control signal ColorSel or a control signal associated with the multiplexing control signal ColorSel.

As shown in FIG. 6, the Red pixels, Green pixels and Blue pixels may be programmed sequentially. It will be appreciated by one of ordinary skill in the art that the programming sequence is not limited to that of FIG. 6, and is changeable by using the color selection control signal.

Figure 7:
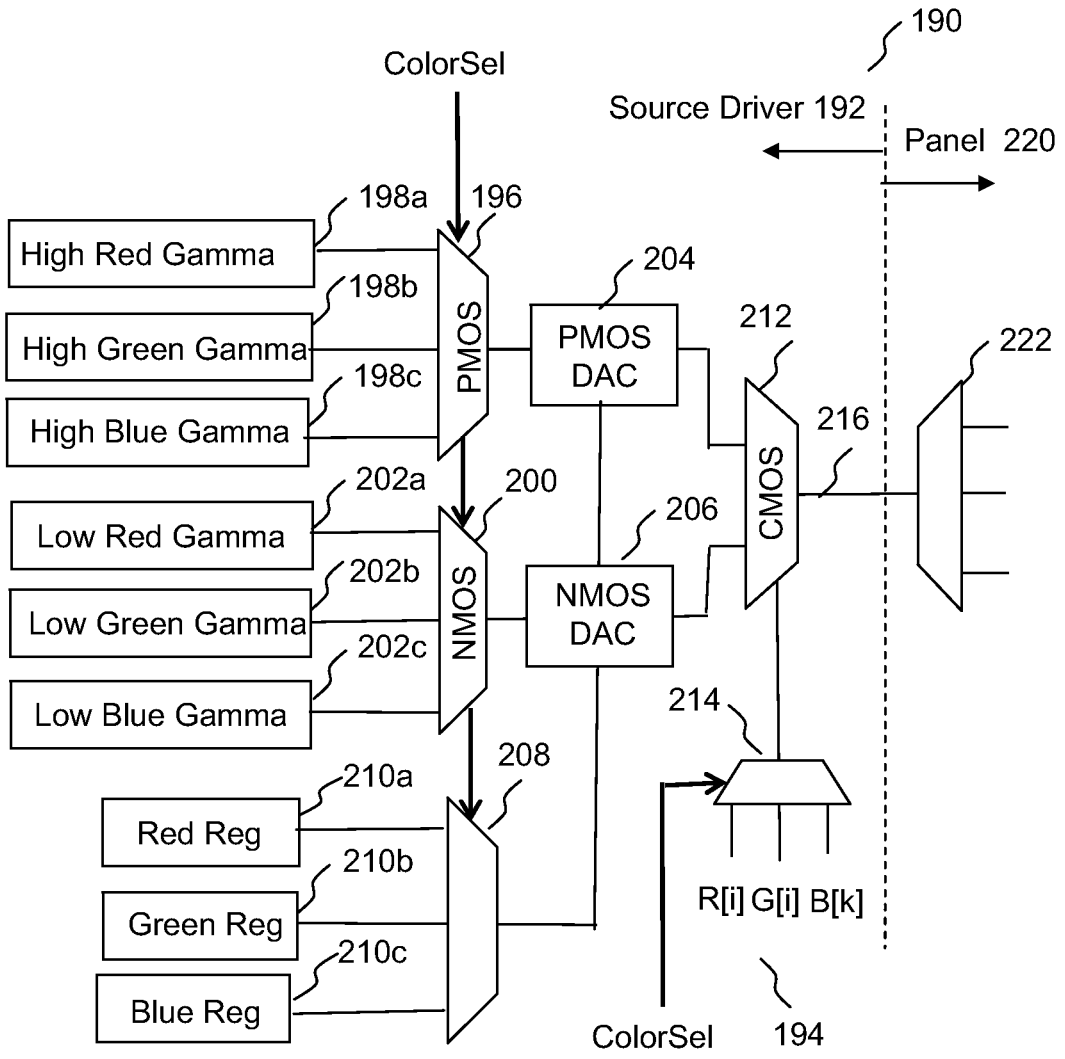
FIG. 7 illustrates a further example of a source driver and a panel for a display system.

Generally, the output range of the voltage required for the light emitting displays is high and thus source drivers are to be a rail-to-rail design for the power. Currently, this results in using multiple CMOS decoders, leading to a larger area source driver. Referring to FIG. 7, there is illustrated a system 190 having a source driver 192 and a panel 220 having sub-pixels for RGB. In this system 190, multiple gammas (gamma corrections, gamma voltages) are multiplexed and a DAC is divided into separate NMOS and PMOS components, resulting in that the source driver 192 area is reduced. One of ordinary skill in the art would appreciate that the source driver 192 and the panel 220 may include components not shown in FIG. 7.

The source driver 192 includes gamma corrections for Red, Blue and Green, each providing a reference voltage to a DAC decoder. The reference voltage is selected based on the dynamic range of the decoder. The reference voltage may be generated using, for example, resistors, or be stored using, for example, registers. Each gamma correction has a high voltage level gamma correction (high voltage level of gamma corrections) and a low voltage level gamma correction (low voltage level of gamma corrections). The high voltage level of gamma corrections is a level from a predefined reference voltage to the high point of the driver output, and the low voltage level of gamma corrections is a level from the predetermined reference voltage to the beginning of the gamma voltage. The predetermined reference voltage may be at the middle for the driver output range. For example, if the driver range is 10V, the predetermined reference voltage is 5V; the high voltage level of gamma corrections is 5 to 10V; and the low voltage level of gamma corrections is 0 to 5V.

The source driver 192 includes a driver output unit 194 having a PMOS multiplexer 196 for the high voltage level of gamma corrections, and a NMOS multiplexer 200 for the low voltage level of gamma corrections. In FIG. 7, the multiplexer 196 multiplexes a high Red gamma correction 198a, a high Green gamma correction 198b and a high Blue gamma correction 198c, and the multiplexer 200 multiplexes a low Red gamma correction 202a, a low Green gamma correction 202b and a low Blue gamma correction 202c.

The driver output unit 194 includes a DAC that is divided into separate components: a PMOS component 204 ("PMOS DAC" in FIG. 7) and a NMOS component 206 ("NMOS DAC" in FIG. 7). The PMOS component 202 includes a PMOS decoder and receives the output from the multiplexer 196. The NMOS component 206 includes a NMOS decoder and receives the output from the multiplexer 200. The reference voltage from the gamma correction is selected based on the dynamic range of the NMOS and PMOS decoders in the components 204 and 206. The PMOS and NMOS decoders in the components 204 and 206 operate on an output from a multiplexer 208 for multiplexing a Red register 210a, a Green register 210b, and a Blue register 210c. The registers 210a, 210b and 210c correspond to the resisters 174a, 174b and 174c of FIG. 5, respectively. The multiplexers 196, 200 and 208 are controlled by a color selection control signal ColorSel.

The driver output unit 194 includes a CMOS multiplexer 212 for multiplexing the outputs from the PMOS and NMOS components 204 and 206. The multiplexer 212 is operated by an output from a multiplexer 214. The multiplexer 214 multiplexes bit signals R[j], G[i], and B[k], based on the color selection control signal ColorSel. R[j] (G[i], B[k]) is a bit that defines when to use which part of the gamma for Red (Green, Blue). The bit R[j] (G[i], B[k]) is generated based on the Red register 210a (210b, 210c) and predefined data about the gamma curve for Red (Green, Blue), e.g., gamma values. The multiplexer 212 outputs a single source driver output 216.

When the bit signal R[j] is active and the other signals are not active, the source driver 192 outputs the driver output 216 based on either the high Red gamma correction or the low Red gamma correction.

A demultiplexer 222 is employed on the panel 220 side to demultiplex the source driver output 216. The demultiplexer 222 corresponds to the demultiplexer 182 of FIG. 5. The demultiplexer 222 is implemented using, for example, thin film transistors, on the panel 220. The outputs from the demultiplexer 222 are couples to three data lines. The demultiplexer 222 may be controlled by the control signal ColorSel or a control signal associated with the multiplexing control signal ColorSel. Based on the output from the demultiplexer 222, one of three data lines is active. The driver output 216 is demultiplexed 222 on the panel 220 side and goes to different subpixels (i.e., Red subpixel, Blue subpixel, Green subpixel).

Based on the image data, one of the low gamma correction and the high gamma correction is selected. For example, if the high voltage level of gamma corrections is 5 to 10V, the low voltage level of gamma corrections is 0 to 5V, and the image data requires 6 V, the high end of gamma correction will be selected.

Based on the color selection control signal ColorSel, the Red pixels, Green pixels and Blue pixels may be programmed sequentially, similar to that of FIG. 6. It will be appreciated by one of ordinary skill in the art that the programming sequence is not limited to that of FIG. 6, and is changeable by using the color selection control signal.

Instead of using a CMOS decoder that has twice as many transistors as a PMOS or NMOS decoder for the entire range the output voltage, the PMOS decoder 204 is used for the higher range and the NOMS decoder 206 for the lower range of the voltage. Thus, the area will be reduced by using twice less transistors.

Figure 8:
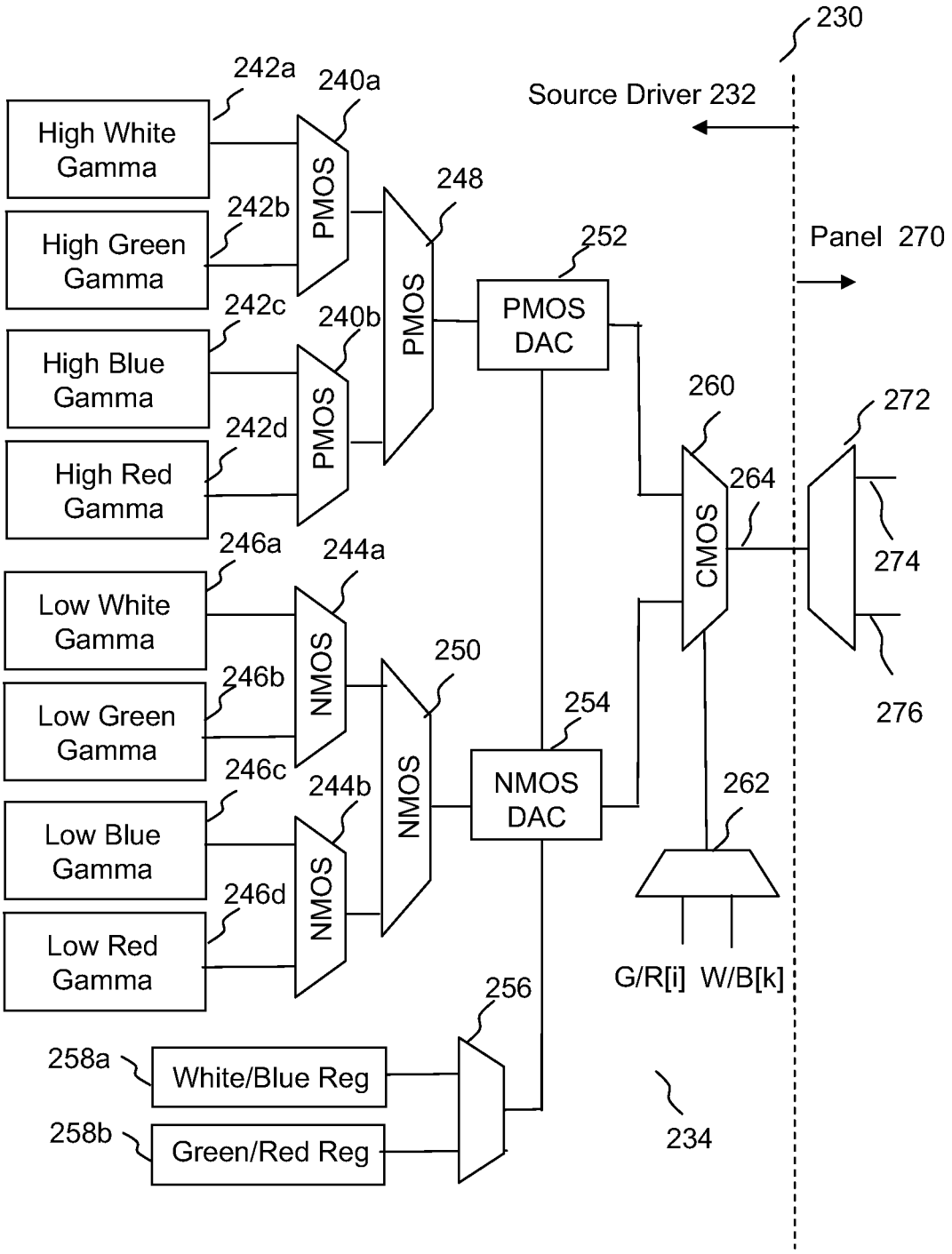
FIG. 8 illustrates a further example of a source driver and a panel for a display system having RGBW pixel structure.

Referring to FIG. 8, there is illustrated a system 230 having a source driver 232 and a panel 270 having subpixels. The system 230 is applied to quad RGBW pixel structure. Multiple gamma corrections for White, Green, Blue and Red are multiplexed in the source driver 232. In the source driver 232, four different gamma corrections are generated (White, Green Blue and Low) for each of high voltage level and low voltage level. One of ordinary skill in the art would appreciate that the source driver 232 and the panel 270 may include components not shown in FIG. 8.

The source driver 232 includes gamma corrections for White, Green, Blue and Red, each providing a reference voltage to a DAC decoder. The gamma correction may be generated using, for example, resistors, or be stored using, for example, registers. Each gamma correction has a high voltage level gamma correction (high voltage level of gamma corrections) and a low voltage level gamma correction (low voltage level of gamma corrections). As described above, the high voltage level of gamma corrections is a level from the reference voltage to the reference voltage to the high point of the driver output, and the low voltage level of gamma corrections is a level from the reference voltage to the beginning of the gamma voltage.

The source driver 232 includes a driver output unit 270 having PMOS multiplexers 240a and 240b for high voltage level of gamma corrections, and NMOS multiplexers 244a and 244b for low voltage level of gamma corrections. The multiplexer 240a multiplexes a high White gamma correction 242a and a high Green gamma correction 242b, and the multiplexer 240b multiplexes a high Blue gamma correction 242c and a high RED gamma correction 242d. The multiplexer 244a multiplexes a low White gamma correction 246a and a low Green gamma correction 246b, and the multiplexer 244b multiplexes a low Blue gamma correction 246c and a low RED gamma correction 246d.

The driver output unit 270 includes a PMOS multiplexer 248 for multiplexing the outputs from the PMOS multiplexers 240a and 240b, and a NMOS multiplexer 250 for multiplexing the outputs from the NMOS multiplexers 244a and 244b. Based on the image data and a color selection, one of the low gamma correction and the high gamma correction for the selected color is selected.

The driver output unit 270 includes a DAC that is divided into separate components; a PMOS component 252 ("PMOS DAC" in FIG. 8) for the high voltage level of the gamma corrections and a NMOS component 254 ("NMOS DAC" in FIG. 8) for the low voltage level of the gamma corrections. The PMOS component 252 includes a PMOS decoder and receives the output from the multiplexer 248. The NMOS component 254 includes a NMOS decoder and receives the output from the multiplexer 250. The reference voltage from the gamma correction is selected based on the dynamic range of the NMOS and PMOS decoders in the components 252 and 254.

The PMOS and NMOS decoders in the components 252 and 254 operate on an output from a multiplexer 256 for multiplexing a White/Blue register 258a and a Green/Red register 258b. The White/Blue register 258a stores image data for White/Blue. The Green/Red register 258b stores image data for Green/Red. In the RGBW structure, each data line carries data for two different colors. In this example, one data line carries data for White and Blue, and the other data line carries data for Green and Red. In one row, a data line is connected, for example, to White pixels (Green pixels) while during the next row it is connected to Blue pixels (Red pixels). As a result, the register 258a used for White and Blue data is shared, and the register 258b used for Green and Red is shared.

The driver output unit 270 includes a CMOS multiplexer 260 for multiplexing the outputs from the PMOS and NMOS decoders in the components 252 and 254. The multiplexer 260 is operated by a multiplexer 262 for multiplexing bit signals G/R[i] and W/B[k]. W/B[k] (G/R[j]) is a bit that defines when to use which part of the gamma for White or Blue (Green or Red). The bit W/B[k (G/R[j]) is generated based on the White/Blue register 258a (Green/Red register 258b) and predefined gamma values for White and Blue (Green and Red). The multiplexer 260 provides a source driver output 264.

When the bit signal W/B [k] is active, the source driver 192 outputs the source driver output 264 based on the high White gamma correction, the low White gamma correction, the high Blue gamma correction, the low White gamma correction or the low Blue gamma correction.

A demultiplexer 272 is employed in the panel 270 side to demultiplex the driver output 264 from the source driver 232. The demultiplexer 272 is implemented using, for example, thin film transistors, on the panel 270. The outputs from the demultiplexer 272 are couples to two data lines 274 and 276. The demultiplexer 272 is controlled by a control signal associated with the color selection. Based on the output from the demultiplexer 272, one of two data lines 274 and 276 is active. The driver output 264 is demultiplexed 272 on the panel 270 side and goes to different subpixels (i.e., White subpixel, Blue subpixel, Green subpixel, Red subpixel).

In the source driver 232, one PMOS decoder 254 is used for the higher range and one NOMS decoder 254 for the lower range of the voltage. Thus, the area will be reduced by using twice less transistors than a CMOS decoder.

Figure 9:
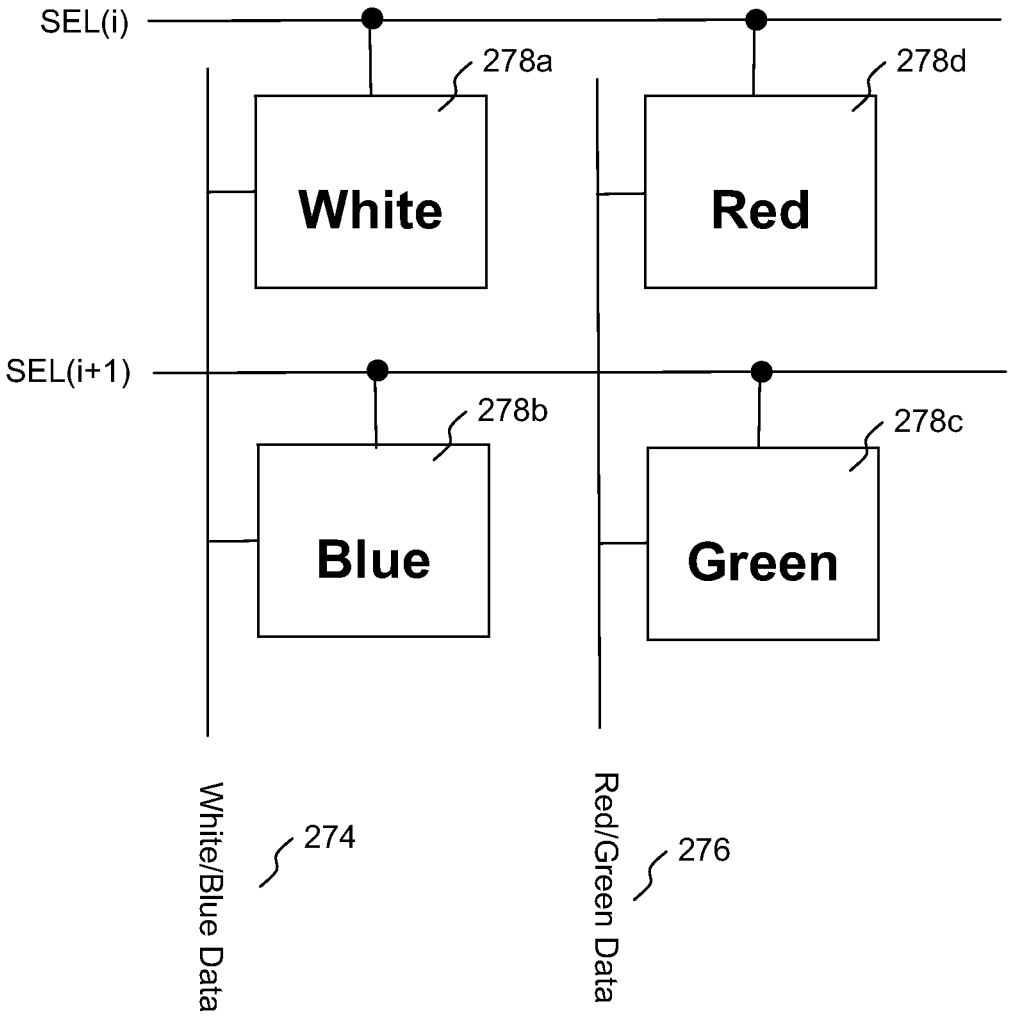
FIG. 9 illustrates an example of subpixel configuration for RGBW pixel stricture.

In the panel 270, instead of having four Red subpixel, Green subpixel, Blue subpixel, and White subpixel side by side, they are configured in a quad arrangement where two subpixels for two colors are in one row and the other two colors are in the other row. In this example, one data line 274 carries data for White and Blue subpixels 278a and 278b, and the other data line 276 carries data for Green and Red subpixels 278c and 278d, as shown in FIG. 9. The subpixels are divided into two rows and two columns. Thus the source driver provides data for two subpixels at a time.

Figure 10:
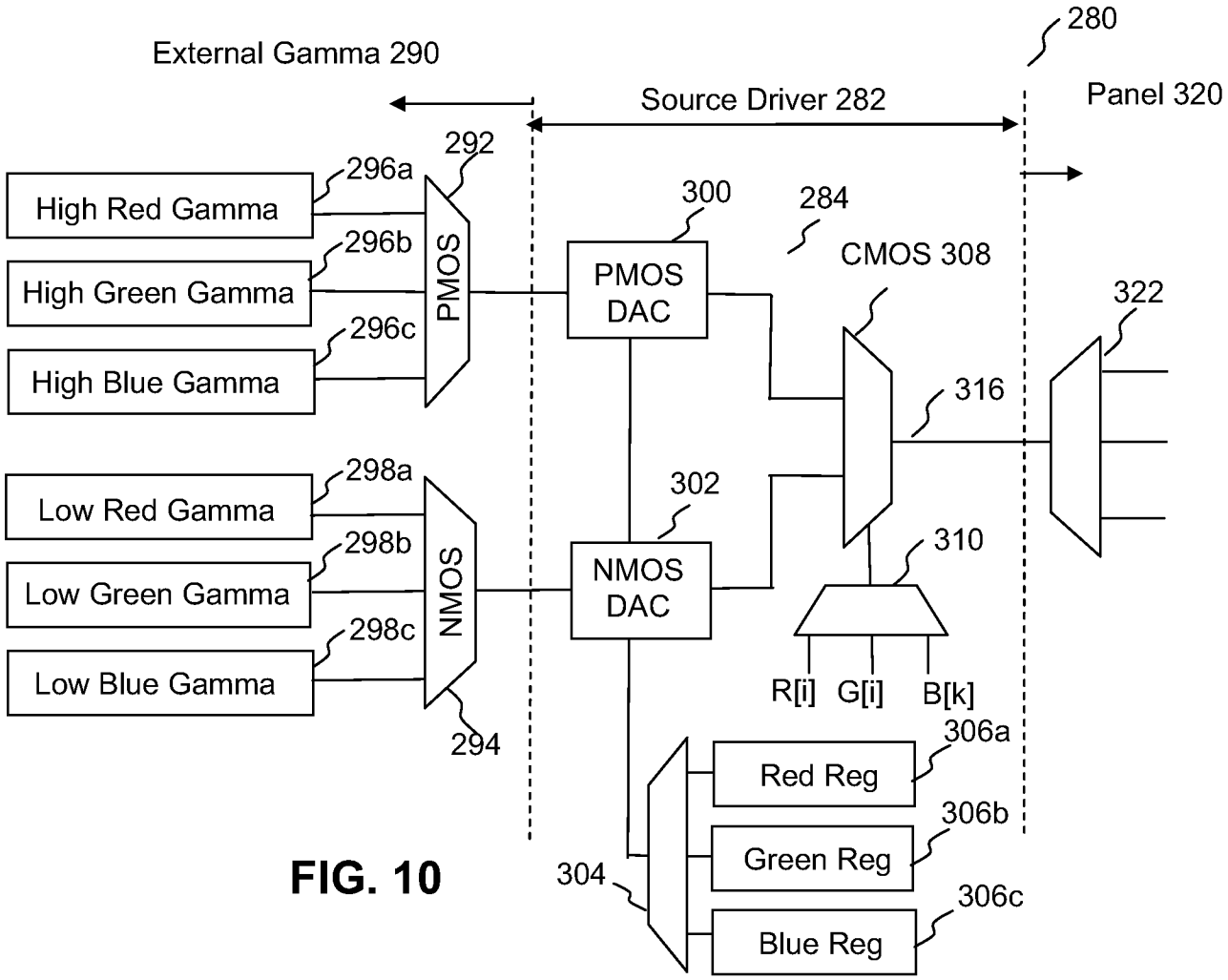
FIG. 10 illustrates a further example of a source driver, external gamma and a panel for a display system.

Referring to FIG. 10, there is illustrated a system 280 having a source driver 282, a panel 320 having pixels, and external gamma buffer area 290. The system 280 is applied to RGB pixel structure. Multiple gamma corrections for Red, Green and Blue are multiplexed in the external buffer area 290. The external gamma buffer area 290 is located external to the source driver area 282 (e.g., external to the source driver IC). The gamma voltages are generated externally and applied to the source driver 282 through buffers in the external gamma buffer area 290. On the display side 320, a demultiplexing is used to provide data for each color. One of ordinary skill in the art would appreciate that the source driver 282, the external gamma buffer area 290 and the panel 320 may include components not shown in FIG. 10.

A PMOS multiplexer 292 is employed in the external gamma buffer area 290 for high voltage level of gamma corrections, and a NMOS multiplexer 294 is employed in the external gamma buffer area 290 for low voltage level of gamma corrections. The multiplexer 292 multiplexes a high Red gamma correction 296a, a high Green gamma correction 296b and a high Blue gamma correction 296c, and the multiplexer 294 multiplexes a low Red gamma correction 298a, a low Green gamma correction 298b and a low Blue gamma correction 298c. The gamma corrections 296a, 296b and 296c correspond to the gamma corrections 198a, 198b and 198c of FIG. 7, respectively and are located outside the source driver 282. The gamma corrections 298a, 298b and 298c correspond to the gamma corrections 202a, 202b and 202c of FIG. 7, respectively and are located outside the source driver 282. The PMOS and NMOS multiplexers 292 and 294 correspond to the multiplexers 196 and 200 of FIG. 7, respectively and are located outside the source driver 282. The outputs from the PMOS and NMOS multiplexers 292 and 294 are provided to the source driver 282.

The source driver 282 includes a driver output unit 284. The driver output unit 284 includes a DAC that is divided into separate components: a PMOS component 300 ("PMOS DAC" in FIG. 10) and a NMOS component 302 ("NMOS DAC" in FIG. 10). The PMOS and NMOS components 300 and 302 correspond to the PMOS and NMOS components 204 and 206 of FIG. 7, respectively. The PMOS component 300 includes a PMOS decoder and receives the output from the multiplexer 292. The NMOS component 302 includes a NMOS decoder and receives the output from the multiplexer 294. The PMOS and NMOS decoders in the components 300 and 302 operate on an output from a multiplexer 304 for multiplexing a Red register 306a, Green register 306b and Blue register 306c. The resisters 306a, 306b and 306b correspond to the registers 210a, 210b and 210c of FIG. 7, respectively.

The driver output unit 284 includes a CMOS multiplexer 308 for multiplexing the outputs from the PMOS and NMOS components 300 and 302. The multiplexer 308 is operated by a multiplexer 310 for multiplexing bit signals R[j], G[i] and B[k]. The multiplexers 308 and 310 correspond to the multiplexers 212 and 214 of FIG. 7, respectively. The multiplexer 308 outputs a single source driver output 316.

A demultiplexer 322 is employed on the panel 320 side to demultiplex the driver output 264 from the source driver 282. The demultiplexer 322 corresponds to the demultiplexer 182 of FIG. 5. The demultiplexer 322 is implemented using, for example, thin film transistors, on the panel 320. The outputs from the demultiplexer 322 are couples to three data lines. The demultiplexer 322 is controlled by a control signal associated with the color selection. Based on the output from the demultiplexer 322, one of three data lines is active. The driver output 316 is demultiplexed 322 on the panel 320 side and goes to different subpixels (i.e., Red subpixel, Blue subpixel, Green subpixel).

In this example, the PMOS decoder component 300 is used for the higher range and the NOMS decoder component 302 for the lower range of the voltage. Thus, the source area will be reduced by using twice less transistors than that of a CMOS decoder. In addition, the gammas are multiplexed and provided from the outside of the source driver 282 area, thus the number of inputs required for the gamma correction is reduced as well.

Figure 11:
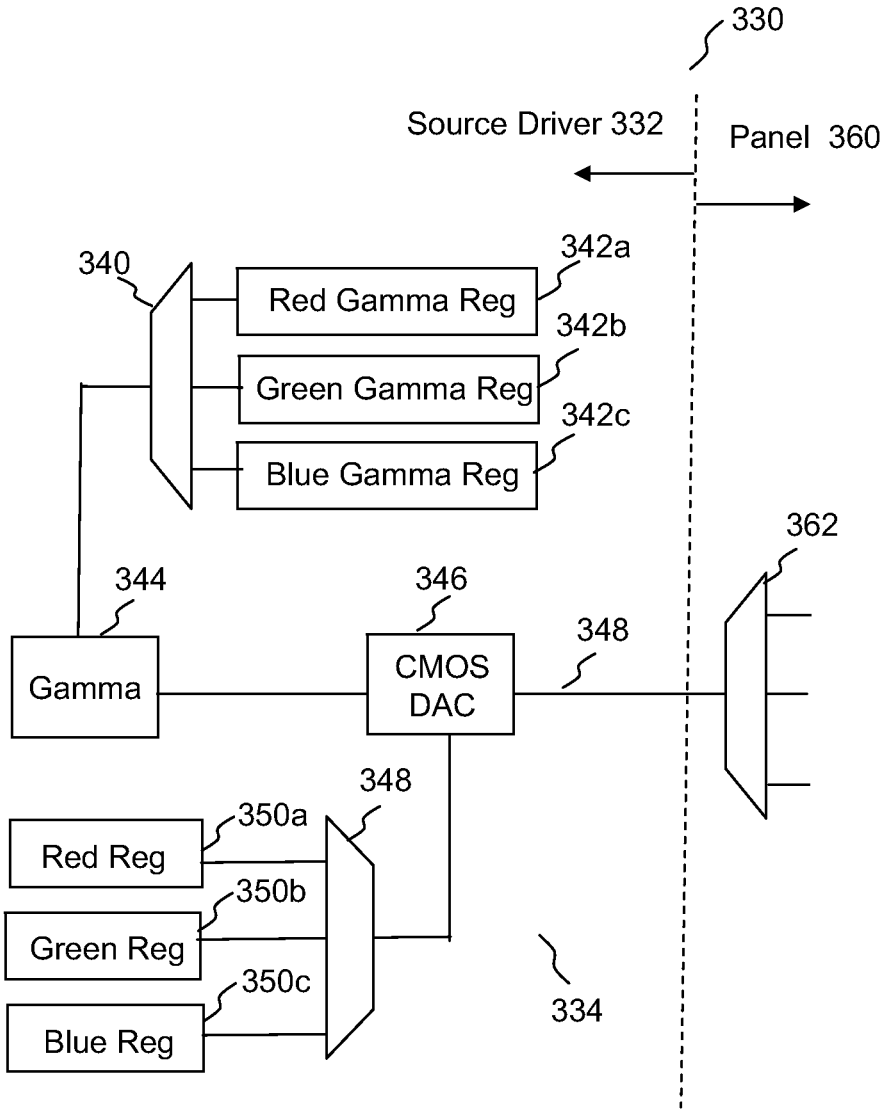
FIG. 11 illustrates a further example of a source driver and a panel for a display system.

For small displays, the gamma correction is internally programmable. The data for gamma correction is stored in internal registers. To reduce the number of gamma registers, DAC resistive ladders and DAC decoders, the gamma registers are multiplexed, as shown in FIG. 11. For programming each color, the corresponding gamma color is assigned to the gamma block. Referring to FIG. 11, there is illustrated a system 330 having a source driver 332 and a panel 360 having pixels. The system is applied to quad RGB pixel structure. Multiple gamma corrections for Red, Green and Blue are multiplexed in the source driver 332. One of ordinary skill in the art would appreciate that the source driver 332 and the panel 360 may include components not shown in FIG. 11.

The source driver 332 includes a driver output unit 334 having a multiplexer 340 for multiplexing a Red gamma register 342a, a Green gamma register 342b and a Blue gamma register 342c, each for storing the corresponding gamma correction data. The gamma correction is internally programmed (configurable), and the data for the gamma correction is stored in the resister. The driver output unit 334 includes a gamma circuit 344 for generating the gamma voltage based on its input signals from the multiplexer 340 (i.e., data from the gamma resister 342a, 342b, 342c). The gamma circuit 344 may be, for example, but not limited to, a digital potentiometer or a DAC.

The driver output unit 334 includes a CMOS DAC 346 that has a decoder and receives the output from the gamma correction 344. The DAC decoder in the DAC 346 operates on an output from a multiplexer 348 for multiplexing a Red register 350a, a Green register 350b and a Blue register 350c. The registers 350a, 350b and 350c correspond to the resisters 174a, 174b and 174c of FIG. 5, respectively. The driver output 348 from the DAC decoder 346 is demultiplexed at a demultiplexer 362 in the panel 360 and goes to different subpixels (e.g., Red subpixel, Green subpixel and Blue subpixel). The demultiplexer 362 is implemented using, for example, thin film transistors, on the panel 360.

Figure 12:
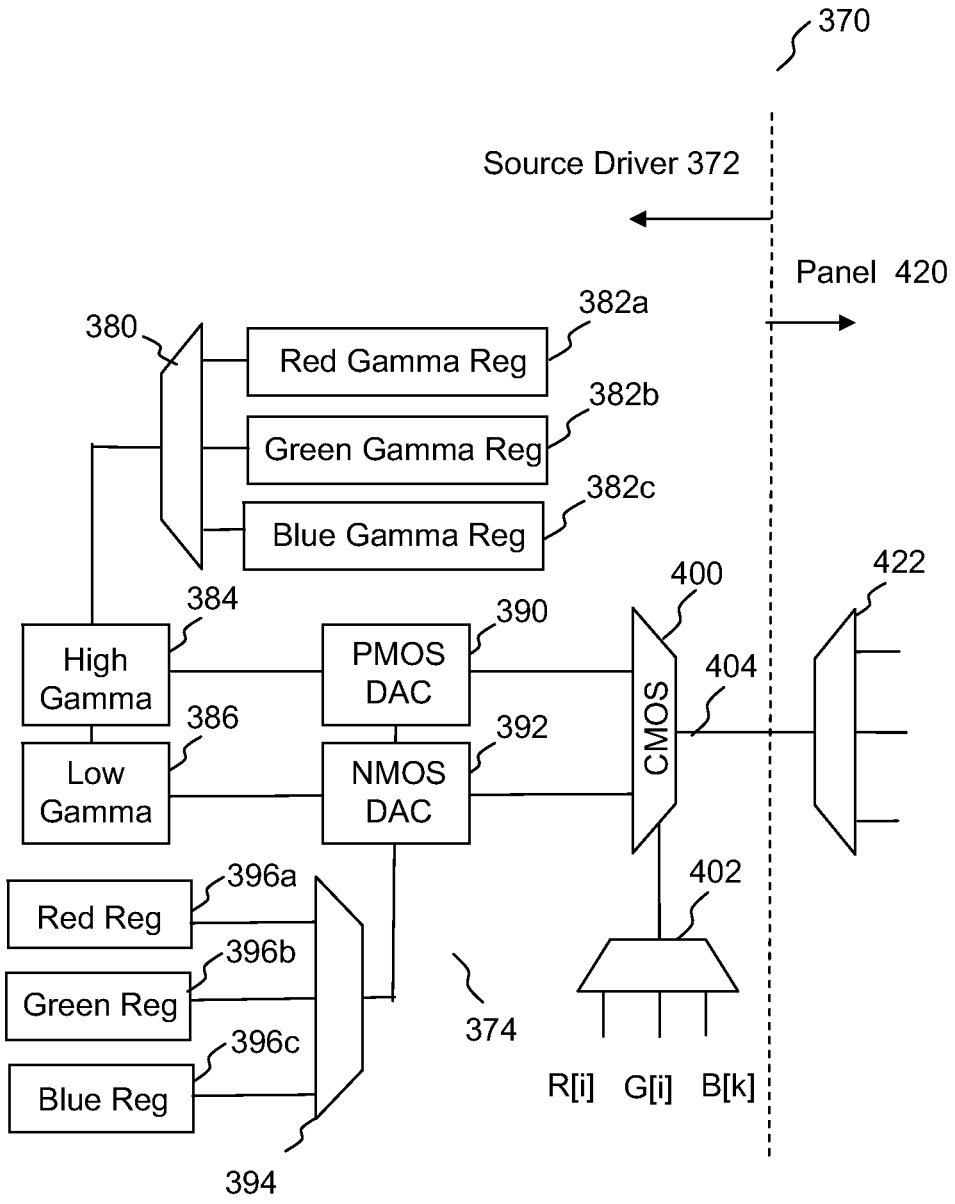
FIG. 12 illustrates a further example of a source driver and a panel for a display system.

For further improving the source driver area, the DAC is divided into NMOS and PMOS decoders as shown in FIG. 12. Referring to FIG. 12, there is illustrated a system 370 having a source driver 372 and a panel 420 having pixels. The system 370 is applied to RGB pixel structure. Multiple gamma corrections for Red, Green and Blue are multiplexed in the source driver 372. One of ordinary skill in the art would appreciate that the source driver 372 and the panel 420 may include components not shown in FIG. 12.

The source driver 372 includes a driver output unit 374 having a multiplexer 380 for multiplexing a Red gamma register 382a, a Green gamma register 382b and a Blue gamma register 382c. The gamma registers 382a, 382b and 382c correspond to the gamma resisters 342a, 342b and 342c of FIG. 11, respectively. The driver output unit 374 includes a high gamma circuit 384 and a low gamma circuit 386. The high gamma circuit 384 generates a high gamma voltage based on its input signals from the multiplexer 380 (i.e., data from the gamma resister 382a, 382b, 382c). The low gamma circuit 386 generates a low gamma voltage based on its input signals from the multiplexer 380 (i.e., data from the gamma resister 382a, 382b, 382c). Each of the gamma circuits 384 and 386 may be, for example, but not limited to, a digital potentiometer or a DAC.

The driver output unit 374 includes PMOS and NMOS components 390 and 392. The PMOS component 390 includes a PMOS decoder and is provided for the high gamma 384. The NMOS component 392 includes a NMOA decoder and is provided for the low gamma 386. The PMOS and NMOS components 390 and 392 correspond to the PMOS and NMOS components 204 and 206 of FIG. 7. The PMOS and NMOS decoders in the components 390 and 392 operate on an output from a multiplexer 394 for multiplexing a Red register 396a, a Green register 396b and a Blue register 396c. The registers 396a, 396b and 396c correspond to the resisters 174a, 174b and 174c of FIGS. 5 (210a, 210b and 210c of FIG. 7), respectively.

The driver output unit 374 includes a CMOS multiplexer 400 for multiplexing the outputs from the PMOS and NMOS decoders in the components 390 and 392. The multiplexer 400 is operated by a multiplexer 402 for multiplexing bit signals R[j], G[i] and B[k]. The bit signals R[j], G[i] and B[k] correspond to the bit signals R[j], G[i] and B[k] of FIG. 8. The multiplexer 400 outputs a source driver output 404.

A demultiplexer 422 is employed on the panel 420 side to demultiplex the driver output 404 from the source driver 372. The demultiplexer 422 corresponds to the demultiplexer 182 of FIG. 5. The demultiplexer 422 is implemented using, for example, thin film transistors, on the panel 420. The outputs from the demultiplexer 422 are couples to three data lines. The demultiplexer 422 is controlled by a control signal associated with the color selection. Based on the output from the demultiplexer 422, one of three data lines is active. The driver output 404 is demultiplexed 422 on the panel 420 side and goes to different subpixels (i.e., Red subpixel, Blue subpixel, Green subpixel).

Figure 13:
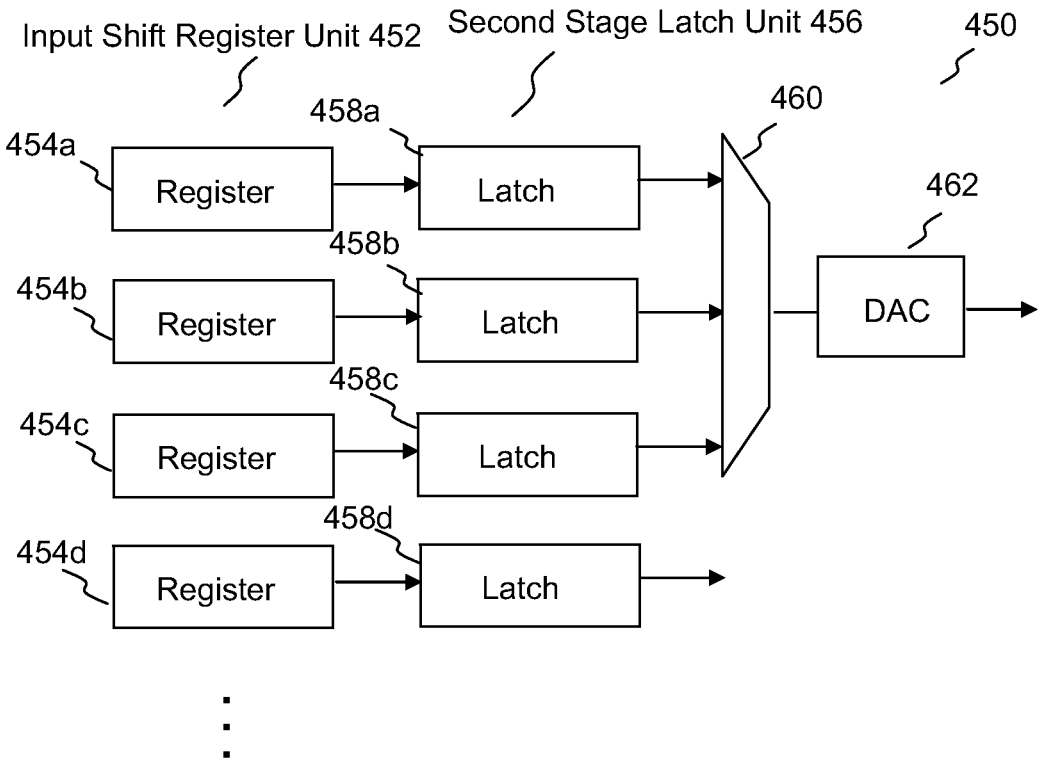
FIG. 13 (Prior Art)
FIG. 13 illustrates a source driver for a conventional display system.

To develop muxing in a source driver, data for each color is multiplexed as shown in FIG. 13. FIG. 13 illustrates a source driver 450 for scanning a panel for a conventional display system. The source driver 450 includes a shift register unit 452 and a latch unit 456. The shift register unit 452 includes a plurality of shift registers 454a-454d, and receives a latch signal. The latch unit 456 includes a plurality of latch circuits 458a-458d that are employed for the shift registers 454a-454b, respectively. Each latch circuit 458a, 458b, 458c, 458d latches a digital image signal in response to the latch signal from the corresponding shift register. The outputs from three latch circuits 458a, 458b and 458c are multiplexed by a multiplexer 460 to output R, G, B image signals. The data for each color is multiplexed 460. A DAC 462 includes a decoder for decoding the output from the multiplexer 460 to output analog image signals.

Figure 14:
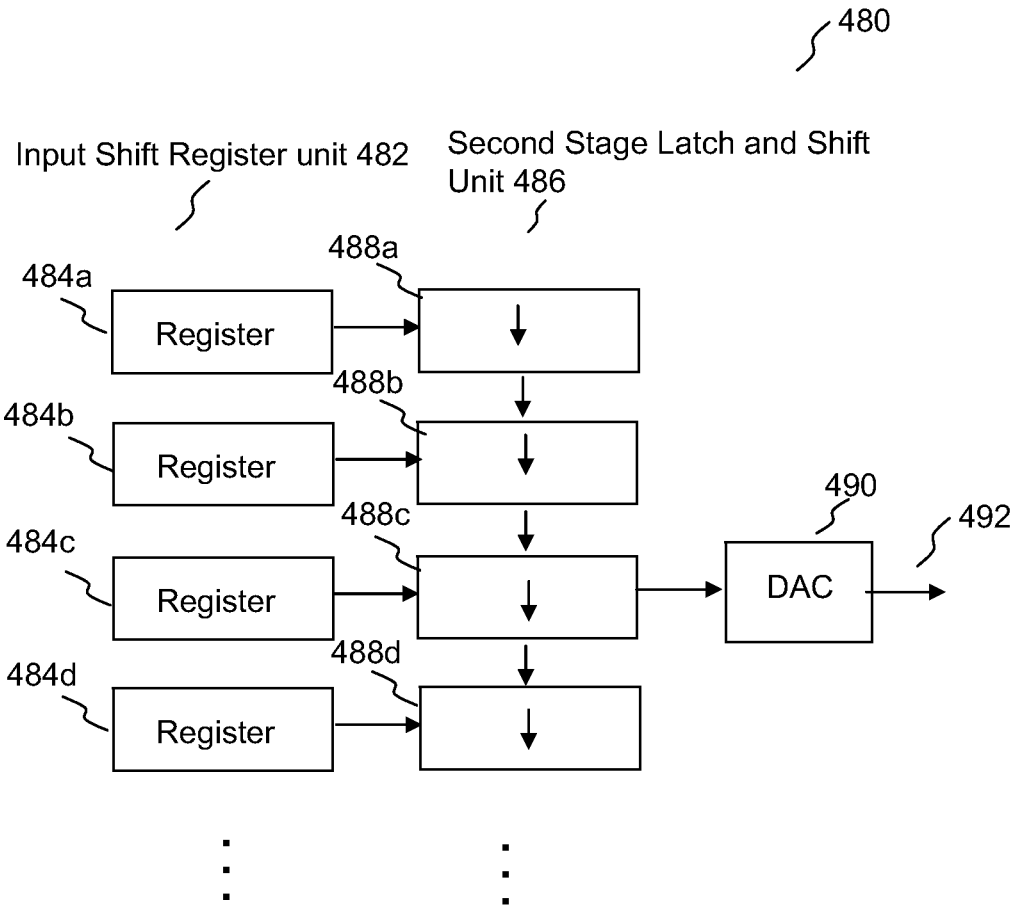
FIG. 14 illustrates a further example of a source driver for a display system.

To further reduce the source area, the latch unit 456 is replaced with shift registers as shown in FIG. 14. Referring to FIG. 14, there is illustrated a source driver 480 for a display system. The source driver 480 includes a first stage shift register unit 482, a second stage latch and shift unit 486, and a DAC unit. The multiplexer 460 of FIG. 13 is not implemented in the source driver 480 side. The shift register unit 482 includes a plurality of shift registers, and each receives a latch signal. The latch and shift unit 486 includes a plurality of latch and shift registers that are employed for the shift registers in the shift register unit 482, respectively. In FIG. 14, four shift registers 484a-484d are shown as an example of the components of the shift register unit 482. In FIG. 14, four latch and shift registers 488a-488d are shown as an example of the components of the latch and shift unit 486. In FIG. 14, one DAC 490 is shown as an element of the DAC unit. The DAC 490 has a decoder. The DAC 490 is coupled to the latch and shift register 488c, which decodes its input and outputs a source driver output 492.

It will be appreciated by one of ordinary skill in the art that the number of the shift registers and the number of the latch and shift registers are not limited to four and may vary. It will be appreciated by one of ordinary skill in the art that the source driver 480 may include components not illustrated in FIG. 14. It will be appreciated by one of ordinary skill in the art that the DAC unit of the source driver 480 may include more than one DAC. In one example, the DAC unit includes a plurality of DACs connected in M intervals.

Each latch and shift register in the second stage latch and shift unit 486 can copy its input signal and keep it intact till the next activation signal. The input signal to the latch and shift register may come from the corresponding first stage shift register or the previous latch and shift register in the chain. As a result, the latch and shift register can store the data for a row from the first stage shift register or it can shift its own data to the next units. For example, the latch and shift register 488a latches a digital image signal in response to an activation signal from the corresponding shift register 484a. The latched signal is shifted to the next latch and shift register 488b.

After the input signal for a row is stored in the shift register unit 482, the second stage latch unit 486 is activated and copies the signals from the shift register unit 482. After that, the second stage latch unit 486 shifts the data one by one to the DACs connected in M intervals connect to the latch unit where M defines the muxing order.

After the first color data is programmed, the latch data is shifted by the number of required bits so that the second data is stored in the latch 488c connected to the DAC 490. This operation is executed for other colors as well until all the colors are programmed. This implementation results in a simpler routing and smaller die area. It will be appreciated by one of ordinary skill in the art that a panel side may have a demultiplexer for demultiplexing the source driver 480 output associated with the M multiplexing operation. It will be appreciated by one of ordinary skill in the art that the source driver 480 is applicable to monochrome displays.

Figure 15:
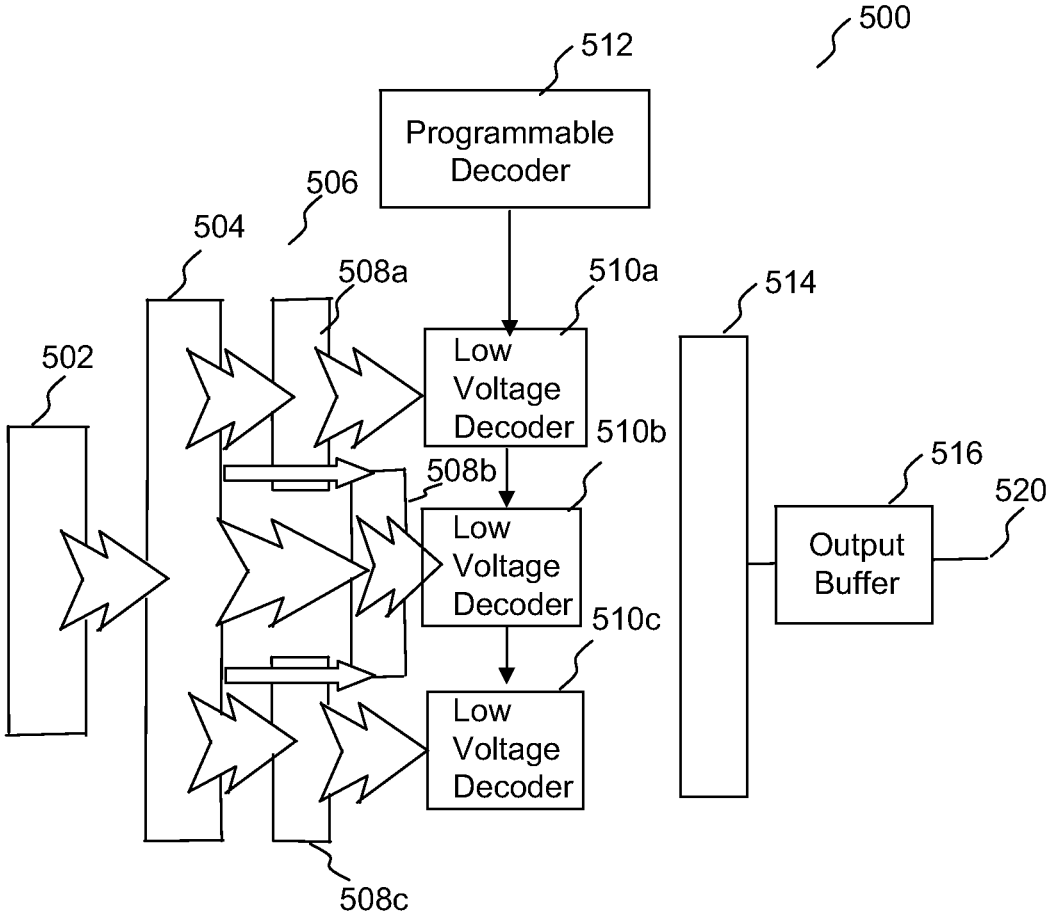
FIG. 15 illustrates a further example of a source driver for a display system.

Referring to FIG. 15, there is illustrated a source driver 500 for a display system. To develop DAC decoders, high voltage fabrication process is used, which results in large die area. Instead of a having one gamma curve that covers the entire output voltage rage (e.g. 0 to 15), the source driver 500 uses a plurality of smaller offset gamma curve segments (sections) at lower voltage range, which are extracted from different part of the complete gamma curve.

The source driver 500 includes a gamma block 502 for changing the color (gray scale) mapping for a display, a resistive ladder 504 for generating reference voltages, and an overlapping multiplexer block 506 for the offset gamma curve sections.

The overlapping multiplexer block 506 includes a plurality of multiplexers, each for multiplexing reference voltages for different colors. In FIG. 15, three multiplexers 508a, 508b and 508c are shown as an example of components of the overlapping multiplexer block 506. The adjacent multiplexer covers different range of the output voltage, having the beginning and the end of the range. However, the end of one range in one multiplexer and the beginning of the other range in the adjacent multiplexer overlap each other. The overlapping provides flexibility in achieving different gamma curve. The same inputs are being used for both multiplexers.

The source driver 500 includes a DAC decoder section that is segmented into a plurality of low voltage decoders for the offset gamma curve sections. In FIG. 15, the three low voltage decoders 510a, 510b and 510c are shown as the elements of the DAC decoder, each operating at low voltage. The two adjacent decoders share a small portion of their dynamic range. A programmable decoder 512 defines the border of each decoder 510a-510c according to the gamma curves. This allows for having different gamma curves for different applications.

Figure 16A:
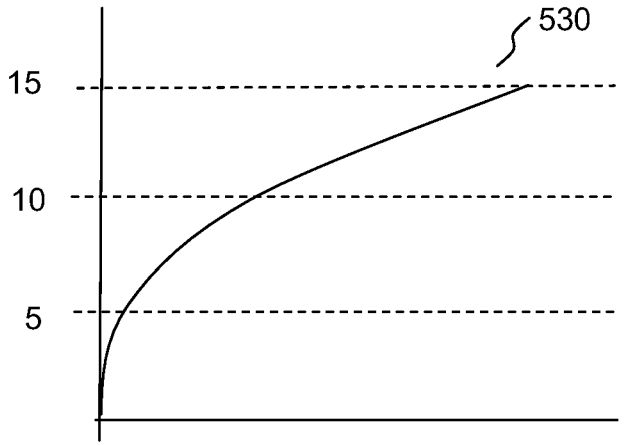
FIG. 16 illustrates an example of a gamma curve and segmented offset gamma curves.
Figure 16B:
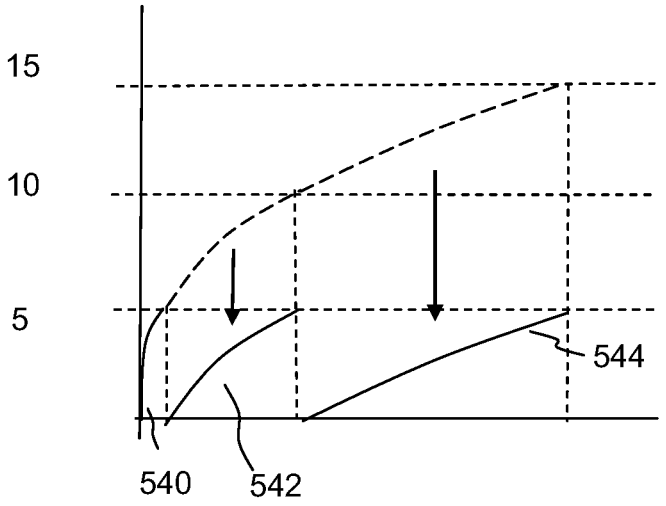

In FIG. 16A, an example of a main gamma curve is illustrated. The main gamma curve 530 of FIG. 16A has a range from 0 to 10V. In FIG. 16B, the main gamma curve 530 of FIG. 16A is segmented into a plurality of offset gamma curve sections 540, 542 and 544. Each offset gamma curve section has a shape corresponding to that of the same section of the main gamma curve 530, and has a voltage range 0 to 5V. The gamma curve section 542 is offset by −5V. The gamma curve section 542 is offset by −10V. Using the offset gamma curve sections, the internal circuits associated with the gamma corrections are offset to lower voltage. The gamma curve section may be internally programmed or input from an external area or device. The display system may include a module for programming/defining offset gamma curve sections. This module may be integrated or operate in conjunction with the programmable decoder 512.

Referring to FIGS. 15 and 16B, the multiplexer 508a is allocated for one offset gamma curve section (e.g., 540 of FIG. 16B) and the low voltage decoder 510a uses that offset gamma curve section. The multiplexer 508b is allocated for another offset gamma curve section (e.g., 542 of FIG. 16B) and the low voltage decoder 510b uses that offset gamma curve section. The multiplexer 508c is allocated for the other offset gamma curve section (e.g., 544 of FIG. 16B) and the low voltage decoder 510c uses that offset gamma curve section. The low voltage decoders 510a, 510b and 510c are programmable.

The source driver 500 includes an output buffer 516. The output buffer 516 outputs a source driver output 520 based on the output from the decoder and the offset voltage.

Based on the pixel circuit data, one offset gamma curve section with its corresponding decoder is being selected. Then the data is passed to the output buffer 516. In order to create the required voltage, the created voltage is being shifted up at the output buffer 516. If a voltage is selected from the second gamma curve section 542 of FIG. 16B, it will be offset by 5 V at the output buffer 516 to cover for the original offset.

Each segment is in its own well so that the body bias can be adjusted accordingly. The decoder can be implemented in low voltage process, leading to smaller die area (over three times saving).

Figure 17:
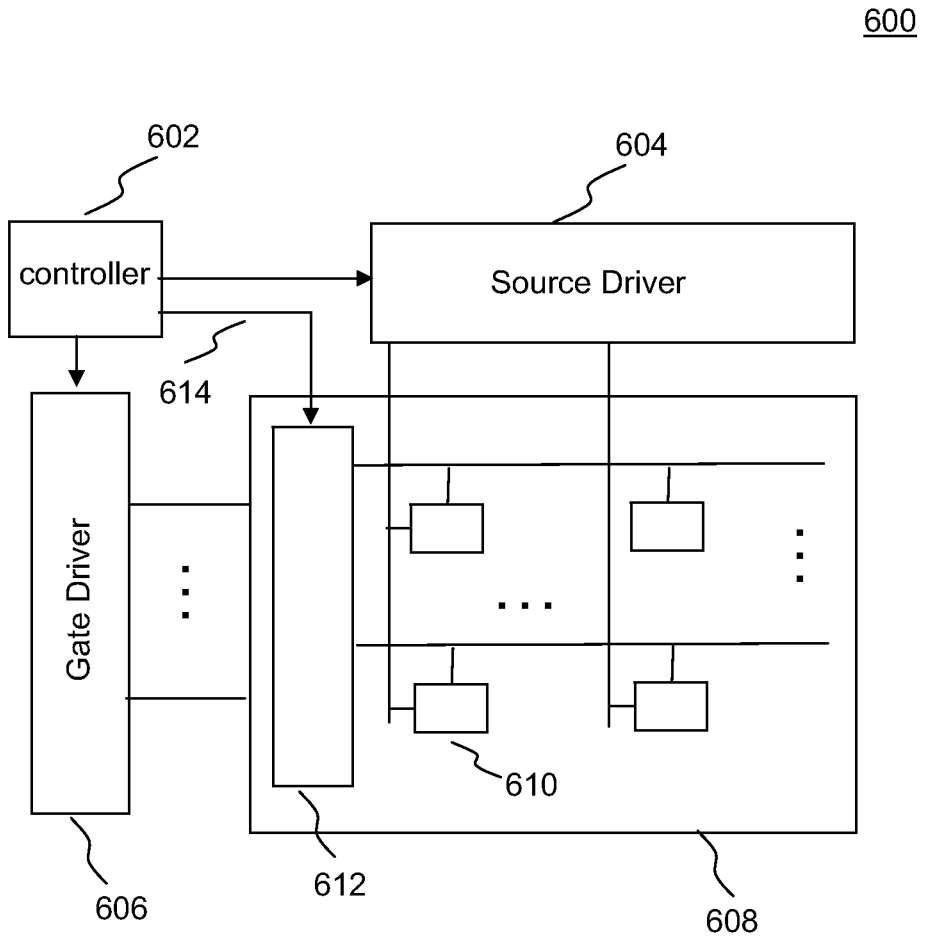
FIG. 17 illustrates an example of a display system having the gate driver of FIG. 1A or 3A.

Referring to FIG. 17, there is illustrated an example of a display system 600. The system 600 includes a controller 602, a source driver IC 604, a gate driver IC 606, and a panel 608. The gate driver 606 may include the gate driver 102 of FIGS. 1A-1B or the gate driver 132 of FIGS. 3A-3B. The panel 608 includes a pixel array having a plurality of pixels (or subpixels) 610 and a demultiplexer 612. The demultiplexer 612 may include the demultiplexer 112 of FIGS. 1A-1B or the demultiplexer 142 of FIGS. 3A-3B. The controller 602 controls the source driver 604 and the gate driver 606. The controller 602 also generates control signals 614 to operate the demultiplexer 612, which may correspond to the control signals CTRL(k) of FIGS. 1A or 3A. The demultiplexer 612 is implemented using, for example, thin film transistors, on the panel 608.

Figure 18:
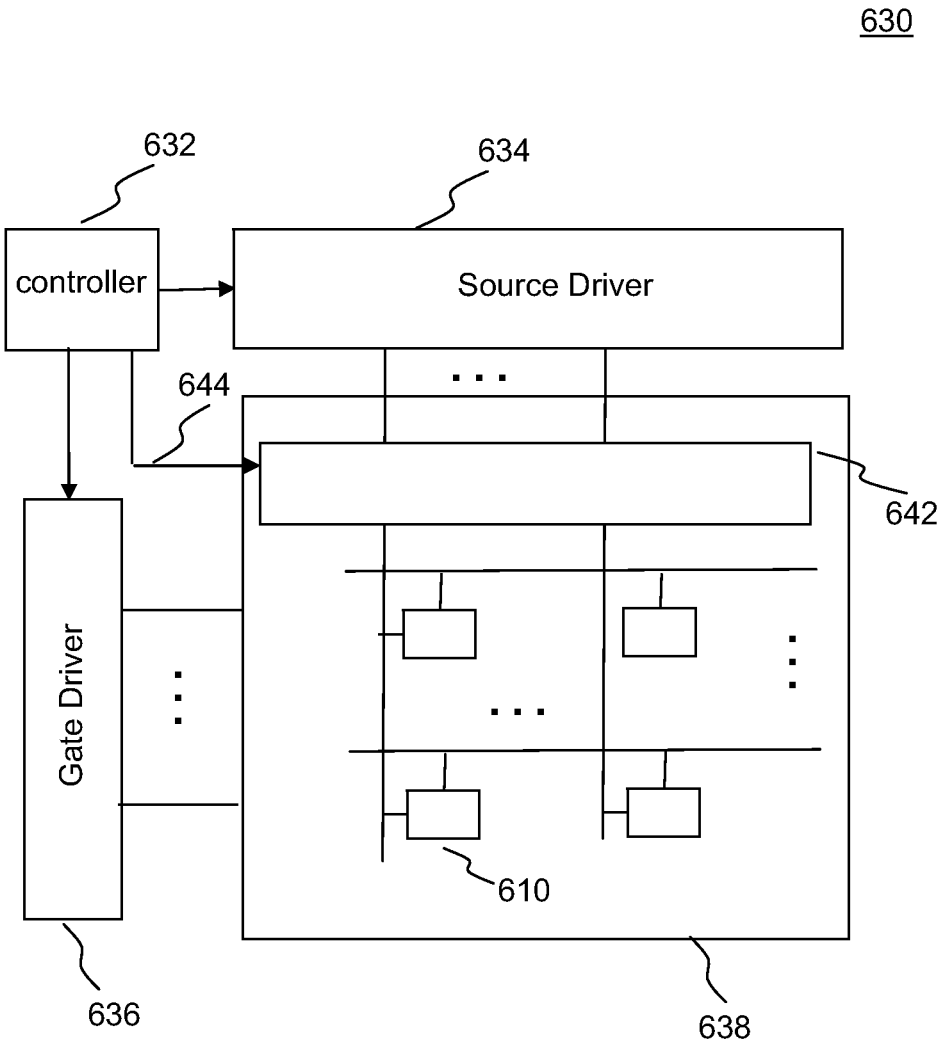
FIG. 18 illustrates an example of a display system having the source driver of FIGS. 5-12.

Referring to FIG. 18, there is illustrated an example of a display system 630. The system 530 includes a controller 632, a source driver IC 634, a gate driver IC 636, and a panel 638. The source driver 632 may include the source driver 162 of FIG. 5, 192 of FIG. 7, 232 of FIG. 8, 282 of FIG. 10, 332 of FIG. 11 or 372 of FIG. 12. The panel 638 includes a pixel array having a plurality of pixels (or subpixels) 610 and a demultiplexer 642. The demultiplexer 642 may include the demultiplexer 182 of FIG. 5, 222 of FIG. 7, 272 of FIG. 8, 322 of FIG. 10, 362 of FIG. 11 or 422 of FIG. 12. The controller 632 controls the source driver 634 and the gate driver 636. The controller 632 also generates control signals 644 to operate the demultiplexer 632. The demultiplexer 642 is implemented using, for example, thin film transistors, on the panel 638. The system 630 may includes the external gamma 290 of FIG. 10.

Figure 19:
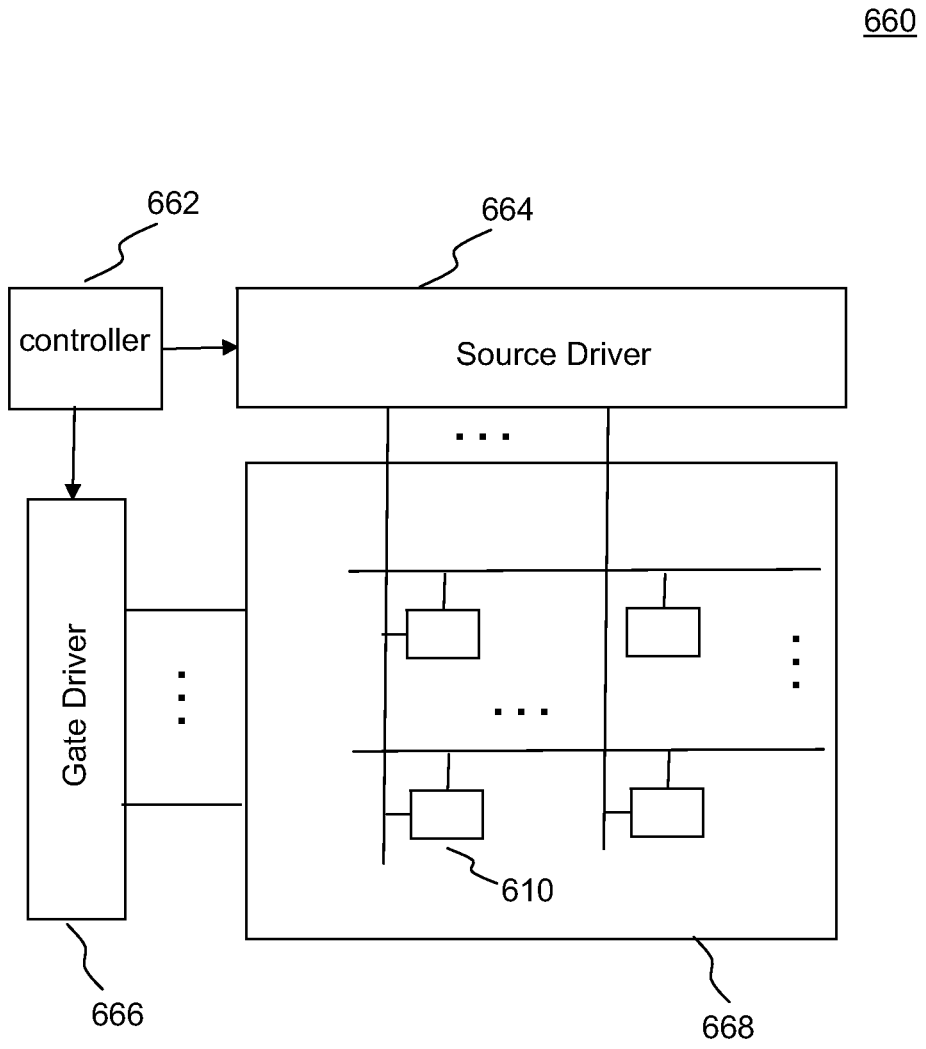
FIG. 19 illustrates an example of a display system having the source driver of FIGS. 14-15.

Referring to FIG. 19, there is illustrated an example of a display system 660 having the source driver elements of FIG. 14 or FIG. 15. The system 660 includes a controller 662, a source driver IC 664, a gate driver IC 666, and a panel 668. The panel 668 includes a pixel array having a plurality of pixels (or subpixels) 610. The controller 662 controls the source driver 664 and the gate driver 666. The controller 662 controls, for example, the shift register unit 482 and the latch and shift unit 486 of FIG. 14 or the overlapping multiplexer block 506 and the low voltage decoders 510a-510b of FIG. 15.

In the above example, the gate drivers and the source drivers are described separately. However, one of ordinary skill in the art would appreciate that any of the gate drivers of FIGS. 1A and 3B can be used with the source drivers of FIGS. 6-15.

What is claimed is:

[1. A drive system for an LED display panel having a multiplicity of LED pixels arranged in rows and columns, each of said LED pixels having a drive transistor that includes a gate, a source and a drain and an LED coupled to said drive transistor, comprising:

a gate driver having at least one address cell providing a single gate driver output for multiple rows of pixels of said display panel, a gate driver multiplexer and a demultiplexer that includes multiple switch blocks coupled to the gate driver and controllably coupling said single gate driver output to said multiple rows of pixels in sequence so that whenever a selected one of said multiple rows is connected to said single gate driver output, all the other said multiple rows are disconnected from said single-game driver output.]

[2. A display system according to claim 1, wherein the gate driver output unit comprises:

at least one multiplexer, the multiplexer for multiplexing driver signals to provide the single gate driver output.]

[3. A display system according to claim 2, wherein the panel comprises:

a demultiplexer having a plurality of switch blocks for activating the first lines, each switch block receiving outputs from the at least one multiplexer.]

*4. A display system, comprising:*

*a light emitting device (LED) display panel having a multiplicity of LED pixels arranged in rows and columns, each of said pixels having a drive transistor that includes a gate, a source and a drain; and*

*a gate driver including:*

*an address cell for providing at least one single gate driver signal; and*

*a multiplexer for multiplexing driver signals to provide the least one single gate driver signal for multiple rows of LED pixels of said LED display panel,*

*the LED display panel including a demultiplexer for demultiplexing said single gate driver signal and including multiple switches for controllably coupling said multiple rows of pixels such that when a selected one of said multiple rows is connected to said single gate driver signal, all the other said multiple rows are disconnected from said single-gate driver signal.*

*5. A display system according to claim 4, wherein the demultiplexer is further for receiving the single gate driver signal from the multiplexer and for activating the multiple rows.*

*6. A display system according to claim 4, wherein the multiple switches of the LED display panel are further for controllably coupling said multiple rows of LED pixels such that when a selected one of said multiple rows is connected to said single gate driver signal, all the other said multiple rows are connected to a ground level voltage.*

*7. A method of driving a light emitting device (LED) display panel having a multiplicity of LED pixels arranged in rows and columns, each of said pixels having a drive transistor that includes a gate, a source and a drain, said method comprising:*

*multiplexing driver signals with use of an address cell and a multiplexer in a gate driver to generate a single gate driver signal;*

*providing the single gate driver signal for multiple rows of said LED pixels of said LED display panel by demultiplexing the single gate driver signal with a demultiplexer of the LED display panel; and*

*controllably coupling said multiple rows of LED pixels such that when a selected one of said multiple rows is connected to said single gate driver signal, all the other said multiple rows are disconnected from said single-gate driver signal.*

*8. A method according to claim 7, wherein controllably coupling said multiple rows of LED pixels is such that when a selected one of said multiple rows is connected to said single gate driver signal, all the other said multiple rows are connected to a ground level voltage.*

* * * * *